US008097213B2

(12) United States Patent
Vierheilig et al.

(10) Patent No.: US 8,097,213 B2
(45) Date of Patent: Jan. 17, 2012

(54) CALIBRATION SYSTEM, MATERIAL DELIVERY SYSTEM, AND METHODS FOR SUCH DELIVERY AND CALIBRATION

(75) Inventors: Al Vierheilig, Savannah, GA (US); Brian Dorcheus, Savannah, GA (US)

(73) Assignee: Intercat Equipment, Inc., Sea Girt, NJ (US)

( * ) Notice: Subject to any disclaimer, the term of this patent is extended or adjusted under 35 U.S.C. 154(b) by 759 days.

(21) Appl. No.: 11/923,136

(22) Filed: Oct. 24, 2007

(65) Prior Publication Data

US 2009/0110608 A1    Apr. 30, 2009

(51) Int. Cl.
G05D 7/00 (2006.01)
G01G 19/56 (2006.01)
(52) U.S. Cl. ........ 422/110; 422/105; 422/107; 422/108; 422/111; 422/112; 422/234; 422/145; 73/1.13; 177/50
(58) Field of Classification Search .................. 422/105, 422/107, 108, 110–112, 232, 145; 73/1.13; 177/50
See application file for complete search history.

(56) References Cited

U.S. PATENT DOCUMENTS

| | | | |
|---|---|---|---|
| 4,082,513 A | 4/1978 | Andon et al. | |
| 4,660,881 A | 4/1987 | Komeya et al. | |
| 4,769,127 A | 9/1988 | Erickson et al. | |
| 4,782,427 A | 11/1988 | Marks | |
| 5,389,236 A | 2/1995 | Bartholic et al. | |
| 5,810,045 A | 9/1998 | Evans | |
| 6,358,401 B1 | 3/2002 | Evans | |
| 6,859,759 B2 | 2/2005 | Evans | |
| 6,974,559 B2 | 12/2005 | Evans | |
| 7,001,502 B1 | 2/2006 | Satchwell et al. | |
| 7,050,944 B2 | 5/2006 | Evans | |
| 2001/0041117 A1 | 11/2001 | Comardo | |
| 2003/0027713 A1 | 2/2003 | O'Connor et al. | |
| 2003/0234171 A1 | 12/2003 | Owen et al. | |
| 2004/0099572 A1 | 5/2004 | Evans | |
| 2004/0166032 A1 | 8/2004 | Evans | |
| 2005/0040224 A1 | 2/2005 | Brinton et al. | |
| 2005/0214177 A1 | 9/2005 | Albin et al. | |
| 2006/0074571 A1* | 4/2006 | Evans ........................... 702/50 |
| 2006/0140824 A1 | 6/2006 | Evans | |
| 2007/0189935 A1 | 8/2007 | Yaluris et al. | |
| 2008/0029432 A1 | 2/2008 | Elliott et al. | |
| 2008/0029433 A1 | 2/2008 | Elliott et al. | |
| 2008/0050286 A1 | 2/2008 | Elliott et al. | |

OTHER PUBLICATIONS

"IMS to Control Room", Dwg. S-29, Sheet 1, Intercat, Savannah, Georgia, Nov. 26, 2001.
International Search Report and Written Opinion dated Nov. 24, 2008 in PCT/US2008/078492 in the name of Intercat Equipment, Inc., 8 pages.
PCT international search report and written opinion of PCT/US2008/078492 dated Apr. 27, 2010.

* cited by examiner

Primary Examiner — Walter Griffin
Assistant Examiner — Lessanework Seifu
(74) Attorney, Agent, or Firm — Kevin M. Carroll; Patterson & Sheridan, LLP

(57) ABSTRACT

Material delivery systems, methods of delivering material and methods of calibrating such systems and methods are disclosed. The material delivery system includes a delivery vessel, a load cell, and automated weight calibration device. The delivery vessel has at least an outlet adapted for coupling to an unit. The load cell is configured to provide a metric indicative of an amount of material in the delivery vessel. The automated weight calibration device is configured to impart a known force onto the at least one load cell. A method includes delivering material to a unit and determining how much material is delivered by a change in weight of a delivery vessel, wherein the delivery vessel comprises a load cell; applying a known calibration force to the load cell; and comparing a metric from the load cell of the known calibration with an expected metric.

23 Claims, 12 Drawing Sheets

CALIBRATION SYSTEM, MATERIAL DELIVERY SYSTEM, AND METHODS FOR SUCH DELIVERY AND CALIBRATION

CROSS-REFERENCE TO RELATED APPLICATIONS

This application is related to U.S. patent application Ser. No. 11/168,685 filed Jun. 28, 2005 which is a divisional of U.S. Pat. No. 6,974,559 issued Jan. 13, 2005, U.S. patent application Ser. No. 11/276,899, filed Mar. 17, 2006, entitled "Multi-Catalyst Injection System" by Evans and U.S. patent application Ser. No. 11/276,903, filed Mar. 17, 2006, entitled "Mobile Fluid Catalytic Cracking Injection System" by Evans, all of which are hereby incorporated by reference in their entireties.

BACKGROUND OF THE INVENTION

1. Field of the Invention

The invention generally relates to material delivery systems and methods of metering and delivering a material to a system or process and methods of calibrating such systems and methods. Particularly, the invention relates to material delivery systems and methods of metering and delivering a material to a fluid catalytic cracking (FCC) unit and methods of calibrating such systems and methods.

2. Description of the Related Art

Some industrial processes, such as fluid catalytic cracking systems, deliver one or more specified amount of a material such as a catalyst(s) or additives. FIG. 1 is a simplified schematic of one embodiment of a conventional fluid catalytic cracking system 130. The fluid catalytic cracking system 130 includes a FCC unit 110 coupled to catalyst or additive addition system, etc. 100, an oil feed stock source 104, an exhaust system 114 and a distillation system 116. Catalyst from the catalyst addition system 100 and oil from the oil feed stock source 104 are delivered to the FCC unit 110.

The catalyst addition system 100 may include a main catalyst injector 102 and one or more additive injectors 106. The main catalyst injector 102 and the additive injector 106 are coupled to the FCC unit 110 by a process line 122. A fluid source, such as a blower or air compressor 108, is coupled to the process line 122 and provides pressurized fluid, such as air, that is utilized to carry the various products, such as a catalyst, additive, equilibrium spent catalyst, catalyst fines, etc. from the injectors 102, 106 through the process line 122 where they are combined with oil from the oil feed stock source 104 and delivered into the FCC unit 110.

FIG. 2 is an embodiment of a conventional additive injector 106. The additive injector 106 includes a pressure vessel 220 and a low pressure storage vessel 240.

Some material delivery systems 100 (i.e. catalyst injection system, catalyst or additive addition system, etc.) use a vessel located on load cells which is capable of metering a specific amount of a catalyst, etc. Weight based systems can vary based on 'gain-in-weight' or 'loss-in-weight' measurement. 'Gain-in-weight' system is sometimes described by its weight function as the load cells monitor a 'gain' in weight as catalyst is added to the delivery vessel. Once the target weight is reached, further additions to the delivery vessel are stopped. The 'loss-in-weight' system fills a delivery vessel with catalyst, but the entire catalyst contained in the delivery vessel is not immediately delivered to the industrial process. In 'loss in weight', the delivery vessel is filled with some quantity of catalyst which is greater than the desired delivery dose to the industrial process. The 'loss in weight' of the delivery vessel is monitored and the resulting desired addition to the industrial process is made. The amount of loss in weight, or the difference in weight between the pre- and post-delivery points represents the specific desired quantity of catalyst delivered to the industrial process.

Weight based systems vary in accuracy, precision of the metering and overall reliability of the system. For example, if the pressure vessel 220 is supported by any of the structural components surrounding it, other than the load cells 210 (such as pipes, electrical conduits, and the like), those components will prevent the load cells 210 from accurately measuring the weight of catalyst added to the pressure vessel 220, and ultimately into the FCC unit 110. Therefore, in order to obtain a reasonably accurate measure of the catalyst, the pressure vessel 220 is not be supported by other components of the system.

To isolate the pressure vessel 220 from the components coupled thereto, flexible connectors, such as bellows 230, are used to couple the pressure vessel 220 to the low pressure vessel 240, the process line 122, and other surrounding components. The bellows 230 allow the pressure vessel 220 to "float" on the load cells 210 so a more accurate reading may be obtained. However, use of flexible bellows 230 does not reliably insure accurate weight measurement of the pressure vessel 220. For example, the weight of the pressure vessel 220 is still slightly supported by the flexible bellows 230—a problem compounded by the fact that a plurality of bellows 230 must be utilized to isolate the pressure vessel 220 from the various components coupled thereto. Therefore, the determination of the weight of the catalyst added to the pressure vessel 220 is still not accurate.

Furthermore, the weight based systems in industrial processes are prone to repeated maintenance failures, particularly when continuous use to deliver consistent performance to FCC units is needed. Frequent repeated maintenance may be due to a large amount of moving parts, high cyclic requirements of the system to fill and discharge relatively small quantities, and load cells, typically in multiples of 3-4 per unit, which fail with age or drift in calibration Any maintenance time results in a consequent FCC down time because of not receiving the catalyst for which the weigh based addition system is supposed to deliver. Such maintenance 'down time' has performance and economic implications on the industrial process.

Thus, a need still exists for an automated and reliable manner, method and system to accurately and consistently deliver a specified quantity of a material to an industrial process.

SUMMARY OF THE INVENTION

The purpose and advantages of embodiments of the invention will be set forth and apparent from the description that follows, as well as will be learned by practice of the embodiments of the invention. Additional advantages will be realized and attained by the methods and systems particularly pointed out in the written description and claims hereof, as well as from the appended drawings.

Material delivery systems and methods of delivering a material and methods of calibrating such material delivery systems and methods are disclosed.

Accordingly, one aspect of the invention includes a material delivery system. The material delivery system includes a delivery vessel, at least one load cell, and automated weight calibration device. The delivery vessel has at least an outlet adapted for coupling to an unit. The at least one load cell is configured to provide a metric indicative of an amount of material in the delivery vessel. The automated weight calibration device is configured to impart a known force onto the at least one load cell.

A second aspect of the invention includes a method of providing a material to an unit. The method includes automated weight calibrating by imparting a known force to a delivery vessel coupled to at least a load cell and measuring the known force imparted on the vessel with a metric indicate of the known force; providing the delivery vessel with a determined weight of the material, wherein the weight is determined by the automated weight calibrating; and delivering the determined weighed material to the unit.

A third aspect of the invention includes a method of providing a material to a unit. The method includes delivering a material to an unit and determining how much material is delivered by a change in weight of a delivery vessel, wherein the delivery vessel comprises a load cell; applying a known calibration force to the load cell; and comparing a metric from the load cell of the known calibration with an expected metric.

A fourth aspect of the invention includes a method of automatically checking the calibration of a delivery vessel. The method includes
i) placing a delivery vessel into a standby mode during which a material is not substantially added or removed from the delivery vessel, wherein the delivery vessel is coupled to at least a load cell;
ii) applying a known weight, either directly or indirectly, to the at least a load cell and measuring the applied weight; and
iii) comparing the measured weight applied to the at least a load cell with the known weight to detect any deviation between the measured weight and known weight.

The accompanying figures, which are incorporated in and constitute part of this specification, are included to illustrate and provide a further understanding of the method and system of the invention. Together with the description, the figures serve to explain the principles of the invention. It is contemplated that features from one embodiment may be beneficially incorporated in other embodiments without further recitation.

BRIEF DESCRIPTION OF THE DRAWINGS

To facilitate understanding, identical reference numerals have been used, wherever possible, to designate identical elements that are common to the figures.

DETAILED DESCRIPTION

Figure 1:
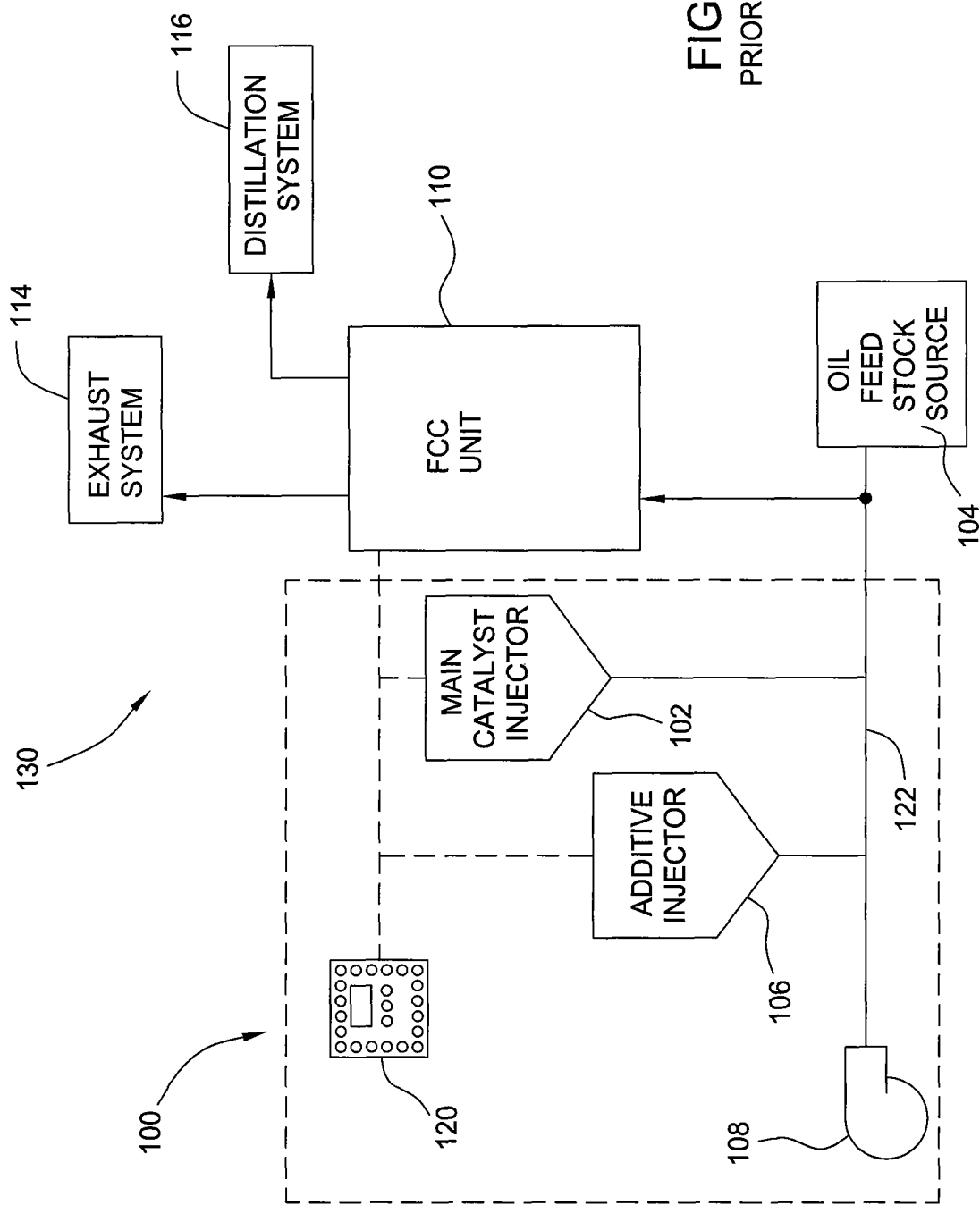
FIG. 1 is schematic view of a conventional fluid catalytic cracking system.
Figure 2:
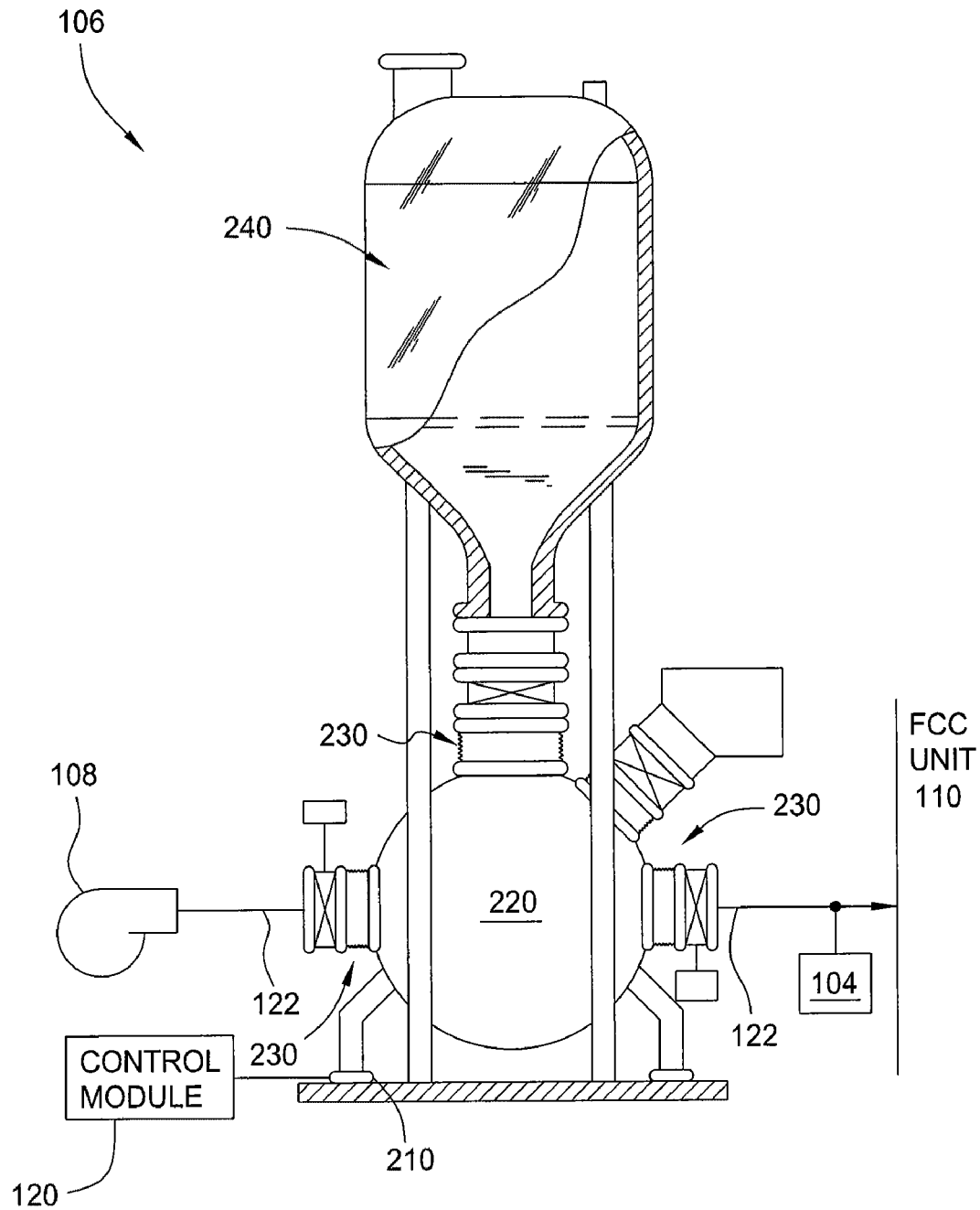
FIG. 2 is a elevation view of a conventional catalyst injector having a low pressure storage vessel.

Reference will now be made in detail to exemplary embodiments of the invention, which are illustrated in the accompanying figures and examples. Referring to the drawings in general, it will be understood that the illustrations are for the purpose of describing a particular embodiment of the invention and are not intended to limit the invention thereto.

Whenever a particular embodiment of the invention is said to comprise or consist of at least one element of a group and combinations thereof, it is understood that the embodiment may comprise or consist of one or more of any of the elements of the group, either individually or in combination with any of the other elements of that group. Furthermore, when any variable or part occurs more than one time in any constituent or in formula, its definition on each occurrence is independent of its definition at every other occurrence. Also, combinations of parts and/or variables are permissible only if such combinations result in stable apparatus, system or method. The invention provides material delivery systems and methods of metering and delivering material to a system and methods of calibrating such systems, apparatus, and methods.

Figure 3A:
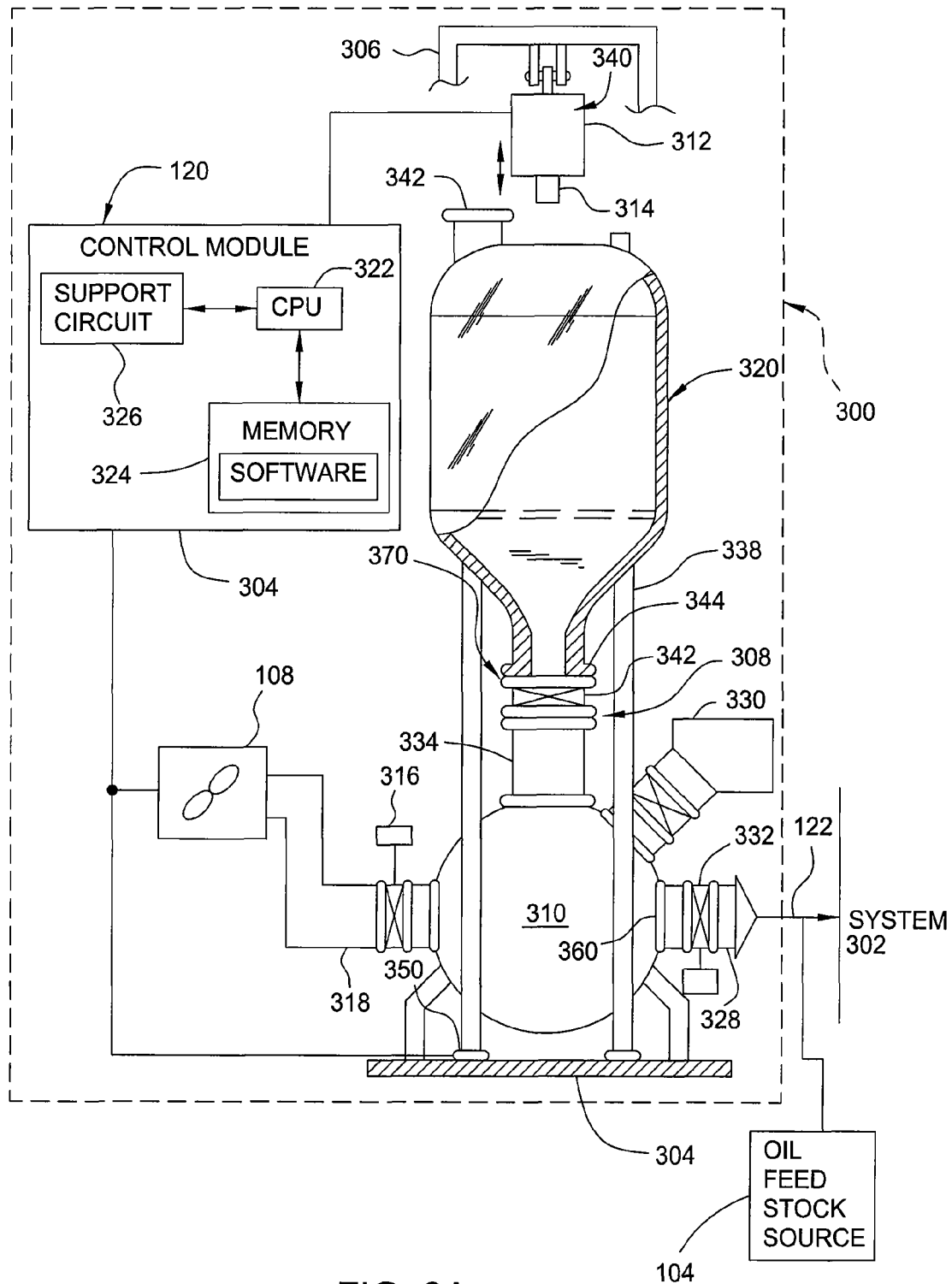
FIG. 3A is a schematic view of a material delivery system in accordance with an embodiment of the invention.

With reference to FIG. 3A, there is shown one embodiment of an material delivery system 300. The material delivery system 300 includes a delivery vessel 310, at least one load cell 350, and automated weight calibration device 340.

The material delivery system 300 is suitable for delivering various materials and embodiments of the invention is not limited by what the material is or the form of the material being delivered. Examples of compositions of material include but are not limited to alumina, silica, zirconia, aluminosilicates, etc., either individually or in a combination of two or more compositions. Non-limiting examples of the form of material include liquid, powder, formed solid shapes such as microspheres, beads, and extrudates, either individually or in a combination of two or more forms. Materials may be referred as and include catalyst, product, powder, additive, equilibrium spent catalyst, and catalyst fines. Non-limiting examples of material delivery systems 300 include a material addition vessel such as a pressurized vessel, a batching vessel for delivering as liquid, powders, and formed solid shapes such as microspheres, beads, and extrudes, either individually or in a combination of two or more, and storage vessels for liquid, powders, and formed solid shapes such as microspheres, beads, and extrudates, either individually or in a combination of two or more.

In a particular embodiment, the material delivery system 300 includes a material delivery system 300. The material delivery system may be supported on a surface 304, such as a concrete pad, metal structure or other suitable support. The delivery vessel has one or more outlets 360 adapted for coupling to the system 302. The automated weight calibration device 340 device is adapted to impart a force of known value to the container 320 or a load cell of the vessel. The at least one load cell 350 is configured to provide a metric indicative of known force imparted on the load cell or delivery vessel.

The material delivery system 300 may also include a separate material storage container and a pressure control device 330. One or more storage containers 320 are interfaced with the load cell 350 such that changes in the weight of a storage container 320 may be utilized to determine the amount of material i.e. catalyst, product, powder, additive, etc. delivered to a system 302 through the delivery vessel 310. The automated weight calibration device 340 may interface with the storage container 320 to provide at least one of a push or pull force coupled to the delivery vessel via one or more inlets 370. The pressure control device 330 is coupled to the delivery vessel and configured to selectively pressurize the pressure vessel relative to the storage vessel to a pressure sufficiently high to provide material to the system. It should be appreciated that the material delivery system can include one or more delivery vessels, one or more separate material storage containers, one or more pressure control devices, one or more automated weight calibration devices, and one or more load cells. The known force applied to the container 320 may be utilized to periodically confirm and/or calibrate the accuracy of the load cell 350.

In the embodiment of FIG. 3A, the automated weight calibration device 340 is coupled to a frame 306 in a position above the container 320. Although not shown, the frame 306 is supported by the surface 304. The frame 306 may be fabricated from any rigid materials suitable for holding the automated weight calibration device 340 in a position relative to the container 320 such that deflection of the frame 306 does not introduce error into the measurement of the force generated by the automated weight calibration device 340 and measured by the load cell 350. It is contemplated that the automated weight calibration device 340 may be alternatively mounted on the side or bottom of the container 320.

The automated weight calibration device 340 is configured to generate a force upon the container 320. As stated above, the force may be a push or pull. The automated weight calibration device 340 may be coupled to the container 320, or only contact the container when actuated to generate the force. It is also contemplated that the automated weight calibration device 340 may be coupled to the container 320 and actuated to exert a force on the frame 306 or surface 304. The automated weight calibration device 340 may be a pneumatic or hydraulic cylinder, a motorized power or lead screw, a cam, a linear actuator or other suitable force generation device. The amount of force generated by the automated weight calibration device 340 is generally selected to be in a range suitable for calibrating the load cells 350. In the embodiment depicted in FIG. 3A, the automated weight calibration device 340 is a pneumatic cylinder 312 having a rod 314 that may be actuated to contact and press against the container 320. By precisely controlling the pressure of the air provided to the cylinder 312, the rod 314 will exert a predetermined force against the container 320 which can be utilized to confirm the accuracy and/or calibrate the load cell 350.

In one embodiment, the material delivery system 300 is configured to deliver material to a system 302 such as, but not limited to, an FCC unit, manufacture of pyridine and its derivatives, manufacture of polypropylene, manufacture of polyethylene, manufacture of acrylonitrile, and other industrial processes, etc. In another embodiment, the delivery vessel 310 has at least outlet 360 adapted for coupling to such a system 302. In a particular embodiment, the material delivery system 300 is configured to deliver material to an FCC unit through the outlet 360 of the delivery vessel 310 that is coupled to the FCC unit. The FCC unit is adapted to promote catalytic cracking of petroleum feed stock provided from a source and may be configured in a conventional manner. One example of an material delivery system that may be adapted to benefit from the invention is described in U.S. Pat. No. 6,974,559, issued Dec. 13, 2005, which is incorporated by reference in its entirety.

Figure 3B:
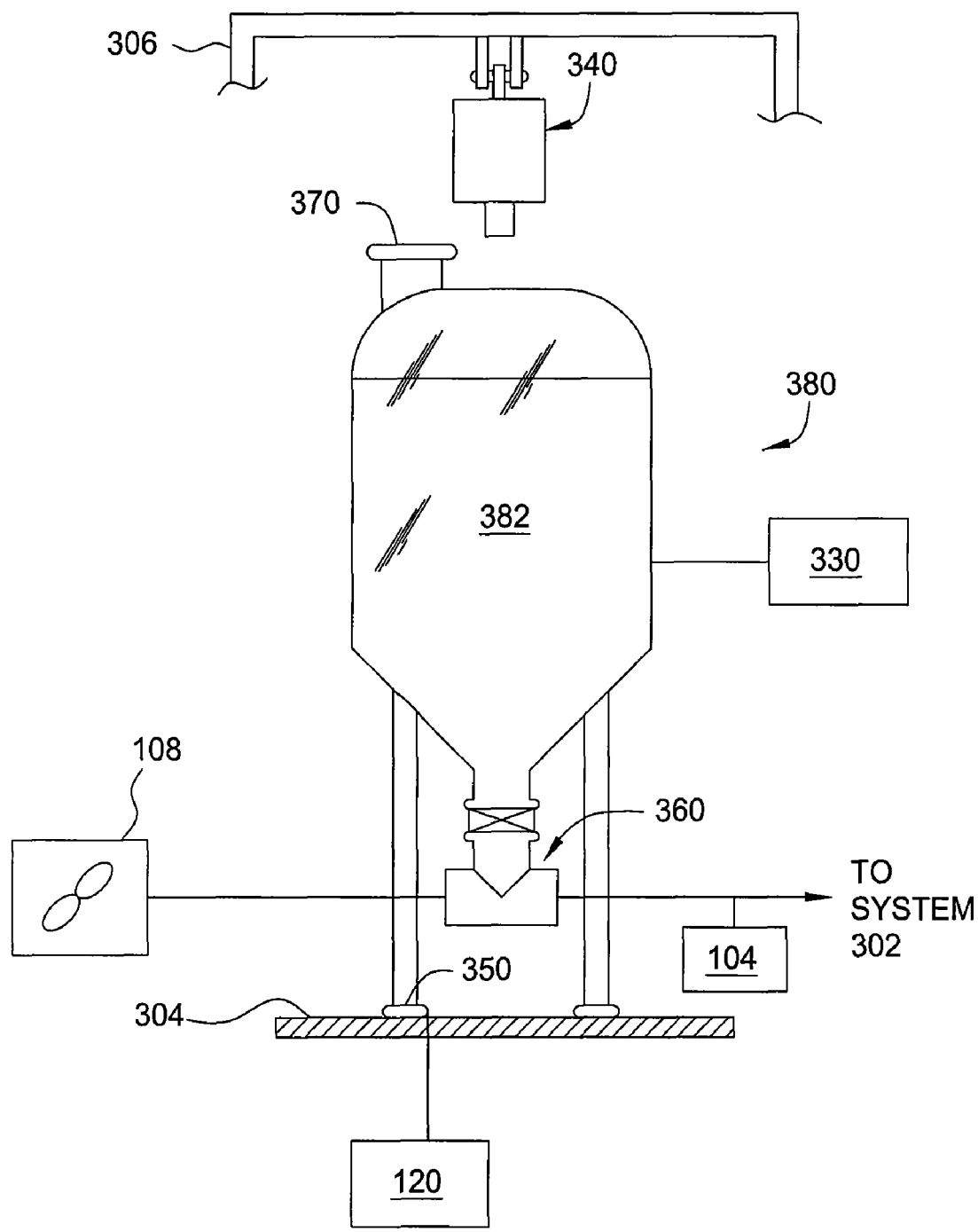
FIG. 3B is a schematic view of a material delivery system in accordance with another embodiment of the invention.

FIG. 3B depicts another embodiment of an material delivery system 380 having an automated calibration device 340 for delivering material to a system 302. The material delivery system 380 includes a pressure vessel 382 of a size suitable for storing enough material for a number of material additions performed over a selected interval, such as over a 24 hour period. The material delivery system 380 generally has a pressure control system 330, and at least one of load cell 350. The vessel 382 is loaded while at atmospheric or sub-atmospheric pressure though an inlet port 370. Once the vessel 382 is loaded, the inlet port 370 is closed and the vessel 382 is pressurized by the pressure control system 330 to a level that facilitates delivery of the material. In one embodiment, catalyst is metered to an FCC system by selectively opening an outlet port 360 of the vessel 382. The load cells 350 are utilized to monitor the change in weight of the vessel 382 such that the amount of material delivered to the system 302 through the outlet port 360 can be resolved. The automated calibration device 340 may be interfaced with the vessel 382 as described above so that the accuracy of the load cells 350 may be maintained. One example of a material delivery system that may be adapted to benefit from the invention is described in U.S. Pat. No. 7,050,944, issued May 23, 2006, which is incorporated by reference in its entirety.

Figure 3C:
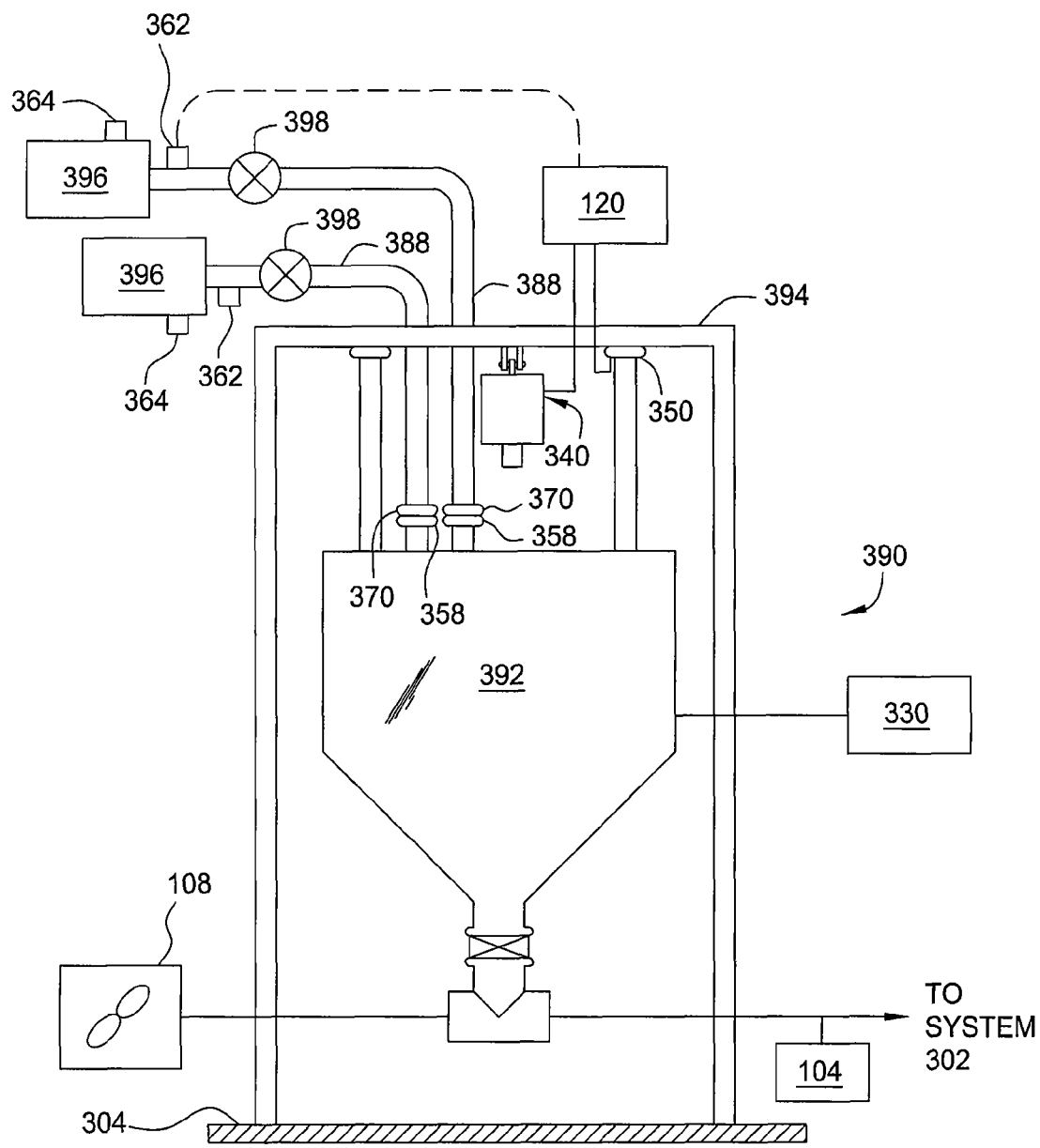
FIG. 3C is a schematic view of a material delivery system in accordance with another embodiment of the invention.

FIG. 3C depicts another embodiment of a material delivery system 390 having an automated calibration device 340 for delivering material to a system 302. The material delivery system 390 includes a pressure vessel 392 shown suspended from a frame 394. Alternatively, the vessel 392 may be supported from the surface 304. The size of the vessel 392 may be selected to store enough material for a number of material additions performed over a selected interval, such as over a 24 hour period. Alternatively, the size of the vessel 392 may be selected to store only enough material for a single addition of material to the system, or for a limited number of additions performed over a selected interval. The material delivery system 390 generally has a pressure control system 330, and at least one of load cell 350. The vessel 392 is loaded while at atmospheric or sub-atmospheric pressure through an inlet port 370 from one or more storage containers 396. Selection between storage containers 396 may be made using a manifold and/or control valves coupling the containers 396 to a common inlet port, or by selectively actuating a respective valve 398 disposed in series with a hose 388 individually coupling each container 396 to a respective inlet port 370. The inlet ports 370 may be fitted with self-sealing quick connects which prevent flow through the port 370 when the hose 388 is not connected. Alternatively, each port 370 may be fitted with a valve to control the flow therethrough. The containers 396 may be used to hold different or the same type of material. Although only two containers 396 are shown, it is contemplated that the material delivery system 390 may be configured to accept any number of containers 396. Once the vessel 392 is loaded, the inlet port 370 is closed and the vessel 392 is pressurized by the pressure control system 330 to a level that facilitates delivery of the material. Material is metered to the system 302 by selectively opening an outlet port 360 of the vessel 392. The load cells 350 are utilized to monitor the change in weight of the vessel 392 such that the amount of material delivered to the system 302 through the outlet port 360 can be resolved. The automated calibration device 340 may be interfaced with the vessel 392 as described above so that the accuracy of the load cells 350 may be maintained.

Figure 3D:
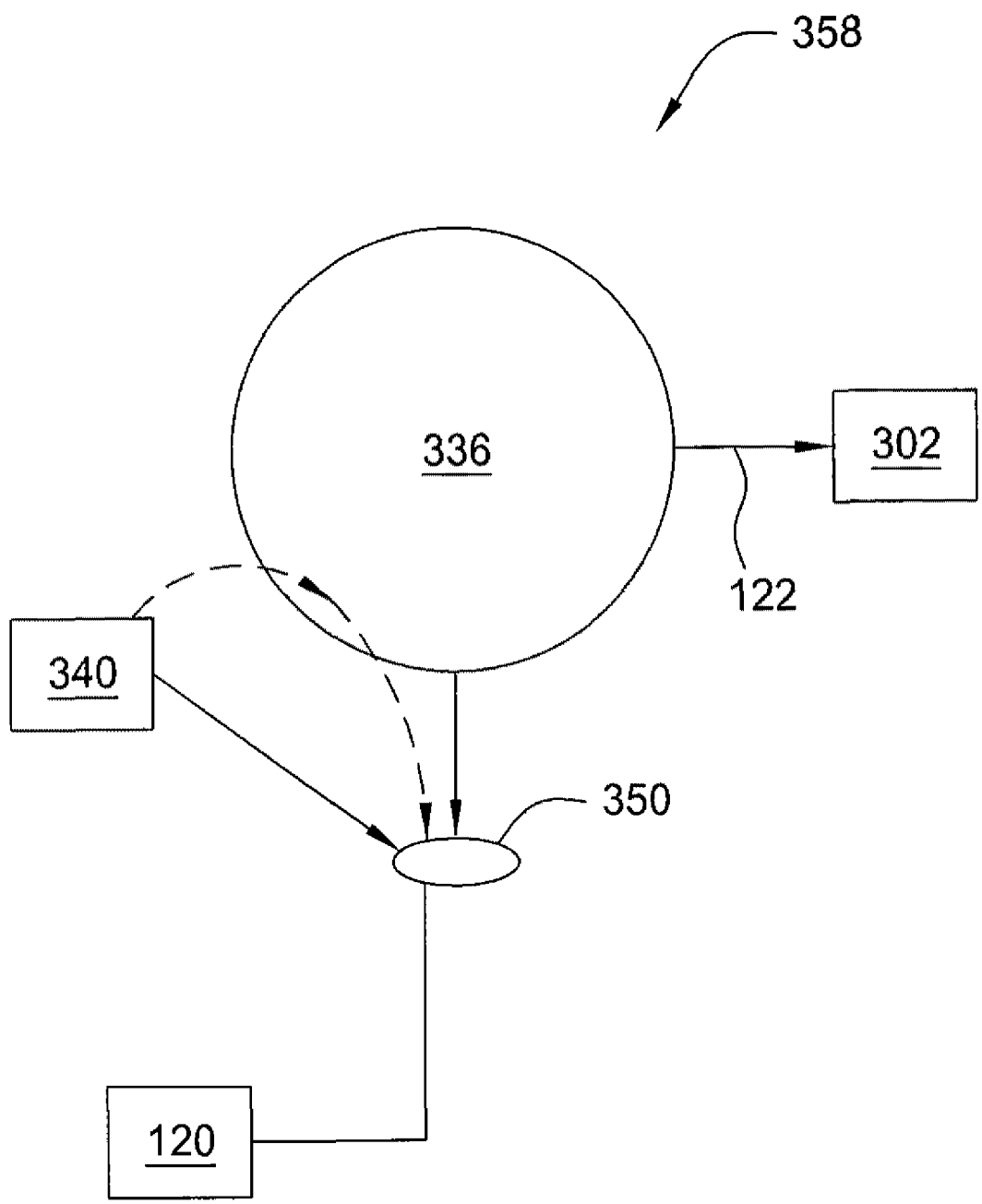
FIG. 3D is an upper level schematic diagram of a material delivery system in accordance with another embodiment of the invention.

FIG. 3D is a high level schematic diagram of another embodiment of a material delivery system 358 suitable for providing material to a system 302, such as an FCC unit. The material delivery system 358 includes one or more vessels 336. At least one vessel 336 is interfaced with one or more load cells 350. The one or more load cells 350 are coupled to the vessel 336 in a manner that enables a control module 120 to resolve an amount of material passing through the system 358 to the system 302. In one embodiment, the one or more load cells 350 are utilized to determine a change in weight of at least one vessel 336 of the system 358, which is indicative of the amount of material provided by the material delivery system 358 to the FCC system 302. A calibration device 340 is provided to apply a known force to the one or more load cells 350 without removing the load cell 350 from the material delivery system 358, thereby allowing calibration of the load cells 350 and/or adjustment of an amount of material delivered without taking the material delivery system 358 off-line.

Automated Weight Calibration Device

The material delivery system 300 includes one or more automated weight calibration devices 340, such as a 'zero weight' calibration for imparting a given force on to the delivery vessel. An empty vessel will not always weigh the same; for example, snow, rain, bird droppings, dirt etc. may affect weight and hence an applied known force can determine if a zero weight is drifting or vessel may have snow or rain, bird droppings, dirt etc.

For delivery vessels which empty its contents following each injection, the zero value of the delivery vessel can be checked and calibrated, as needed. For example, the weight can be checked and calibrated to verify if weight indicator indeed reaches zero weight and calibrate any drift in zero weight.

In one embodiment, while calibrating for zero weight of material check, a loss-in weight delivery vessel, including with its product content i.e. material, etc. is weighed. Following delivery of some material into an FCC unit, the weight of the delivery vessel containing the material decreases. When the delivery vessel weight runs low, new material is added to the delivery vessel. Depending upon the type of material delivery system, some delivery vessels do or do not deliver until the vessel is empty of any material. If the delivery vessel delivers until the vessel is empty of any material, the empty condition permits the zero weight to be confirmed or calibrated. If the delivery vessel is not allowed to reach empty between delivery sequences, then a zero weight cannot be confirmed. In one embodiment, delivery vessel reaches empty at the end of each sequence of delivery to an FCC unit or other industrial process. The weight can be checked and calibrated to verify if weight indicator indeed reaches zero weight with each delivery. If weight indicator is incorrect, then maintenance or other troubleshooting can be initiated.

In an embodiment, the automated weight calibration device imparts a force of known value to the delivery vessel. A known force is applied to check the zero weight, or at any other time to calibrate and verify weight reading accuracy. The calibration device is capable of either directly or indirectly applying a force of known value to the load cells attached to the delivery vessel. The force applied may be a push or pull. The load cell provides a metric indicative of known force imparted on the vessel in weight. The force can be measured in weight, or other units as one wishes.

Force may be imparted onto the load cell in contact with the delivery vessel in a various ways and the invention is not limited by how the force is imparted. Non-limiting examples of imparting or applying force include physical calibration weight, pressure transmitter, electrical transducer, mechanical screw, either individually or a combination of two or more thereof. In one embodiment, the automated weight calibration device imparts a force on the vessel directly proportional to a desired target weight of the vessel without adding any material onto the vessel. In another embodiment, the automated weight calibration device imparts a force of known value to the vessel a plurality of times at desired frequency intervals.

In one embodiment of physical calibration weight method, a known physical mass of weight is applied to the delivery vessel or load cell that results in an increase in weight read by the load cells. In yet another embodiment, force is applied with a known weight of material in the vessel. This known weight will have been measured by another reliable means to confirm its value. Since the weight required to check or perform calibration is typically quite large, several hundreds to thousands of pounds, a hoist or other type of transfer device will likely be required. If the system is automated, then the imparting of known weight to the delivery vessel or load cell may be facilitated by a robot or other actuator.

During an embodiment of pressure transmitter method, pressure is applied to a piston containing device which in turn applies a force to the delivery vessel or attached load cells. Based upon knowledge of piston geometry, and the pressure applied, a force can be applied onto the load cells or delivery vessel which is equivalent to a known weight. For example:

Applied load=Piston area*applied pressure*2 (for two cylinders)

Screw Actuated Load with Measuring (Redundant) Load Cells

An embodiment of electrical transducer method involves using an applied electrical field onto a transducer which in turn applies a force to the load cells. The force created is proportional to the weight applied to the load cells.

Mechanical screw method applies an equivalent weight onto the delivery vessel or load cells via a mechanical screw actuated by an electric motor. Since the load application may not be repeatable per unit deflection, an additional set of load cells may be required to provide the measurement check by checking one set of load cells versus another set of load cells. It is understood that other means of imparting weight are readily possible and the invention is not limited by the manner in which weight is imparted.

Once a known force is applied via one or more techniques above, the measured weight can be recorded and compared with the known weight or weight equivalent. In one embodiment, the control module 120 of the material delivery system includes a CPU 322, support circuits 326 and memory 324. A metric of the known force imparted on the delivery vessel is provided by the load cells 350 to the control module 120, which determines any deviations between the recorded measured metric and known value of the force imparted by the calibration device. The memory may includes instructions that utilize, when executed, one or more feedback loops to take one or more corrective actions when a measured force deviates from the known value of force imparted by the calibration device. Corrective action may be automated via a computer or control module, or configured to provide a flag, audible and/or visual, to the operator. For example, in one embodiment, a computer can automatically make a corrective action to ensure that the next cycle of the delivery vessel is accurate. In another embodiment, the corrective action may create a notification by a variety of means such as, but not limited to, visual, audio, computer, instant message, email, pager, etc); the corrective action to calibrate can then be made with human intervention.

Although the calibration and corrective action can be performed manually, in some embodiments, either one or more of such actions may be automated such as utilizing instructions stored in the memory 224 of the control module 120 to cause certain actions to take place. In a particular embodiment, each delivery of a material to an industrial process may be checked for accuracy of the amount of material delivered by the automated weight calibration device.

Furthermore, the automated weight calibration device may impart a force of known value to the vessel a plurality of times at desired frequency intervals. Thus, the invention is not limited by how or the frequency of the automated weight calibration. If the weight calibration device is manual or the automated calibration is set at intervals too far apart, an error or problem with the load cells may occur and not be detected until the next manual calibration check is performed. Such measurement errors mean that a purchaser of a material entering the industrial process may be charged too much or too little under the pay before delivery [just-in-time consignment procurement] scenario previously discussed.

To avoid or minimize such errors, the invention includes an automated weight calibration device capable of imparting a force of known value to the delivery vessel a plurality of times at desired frequency intervals to calibrate as many times as one wishes based on the degree of accuracy and precision need for an industrial system and acceptable deviation ranges that are allowed for a given weight of material to be delivered. For example, the automated weight calibration device can periodically apply an equivalent weight to the delivery vessel and determine any deviation and continue to deliver material. In one embodiment, the automated weight calibration device imparts an equivalent weight to the delivery vessel and monitors any deviation on a periodic basis, such as per dose, per hour, per day, per week, etc.

The calibration device is not only capable of determining, monitoring and correcting any drift in load cells, but is also capable of determining overall health of load cells, such as failures and load cell health.

Computer Control Unit

In one embodiment, the material delivery system 300 is coupled to the system 302, such as an FCC unit, and is configured to inject one or more materials into the FCC unit to control processing attributes such as the ratio of products recovered in a distiller of the FCC unit and/or to control the emissions from the FCC unit. The material delivery system 300 includes a control module 120 to control the rates and or amounts of material that the material delivery system 300 provides to the FCC system 302.

As discussed above, the control module 120 has a central processing unit (CPU) 322, memory 324, and support circuits 326. The CPU 322 may be one of any form of computer processor that can be used in an industrial setting for controlling various chambers and subprocessors. The memory 324 is coupled to the CPU 322. The memory 324, or computer-readable medium, may be one or more of readily available memory such as random access memory (RAM), read only memory (ROM), floppy disk, hard disk, or any other form of digital storage, local or remote. The support circuits 326 are coupled to the CPU 322 for supporting the processor in a conventional manner. These circuits include cache, power supplies, clock circuits, input/output circuitry, subsystems, and the like. In one embodiment, the control module 120 is a programmable logic controller (PLC), such as those available from GE Fanuc. However, from the disclosure herein, those skilled in the art will realize that other control modules such as microcontrollers, microprocessors, programmable gate arrays, and application specific integrated circuits (ASICs) may be used to perform the controlling functions of the control module 120. One control module 120 that may be adapted to benefit from the invention is described in the previously incorporated U.S. patent application Ser. Nos. 10/304,670 and 10/320,064.

The procedure is generally stored in the memory of the control module 120, typically as a software routine. The software routine may also be stored and/or executed by a second CPU (not shown) that is remotely located from the hardware being controlled by the control module 120. Although the procedure or parts are discussed as being implemented as a software routine, some of the disclosed method steps may be performed in hardware as well as by the software controller, or manually. As such, the invention may be implemented in software as executed upon a computer system, in hardware as an application specific integrated circuit, or other type of hardware implementation, manually, or a combination of software, hardware, and/or manual steps.

In another embodiment, the computer control unit of the material delivery system includes, but is not limited to, one or more of the following components either individually or in a combination of two or more: Interface screen such as a standard or touch screen; Input device such as buttons, mouse, keyboard, touch screen, PLC or other control device; Connection between devices such as direct integration, interconnect cable, Ethernet network; Communication router/modem for connecting to a remote location via land line telco line, internet or other wireless data network; MODBUS or other hardwire connection for connection to the control room or other central location of the plant where the unit is being used; Power supply for providing electrical power to the electrical devices; Solenoid valves, relays, etc. which are connected to either the PLC or central processing unit which are capable of modulating the position of the valves as well as read the input data from the various sensors and other devices connected to the unit; and or Antenna of communication of router/modem to internet or other wireless data network.

Material Delivery System (I.E. Injection or Addition System) Detail

Referring back to FIG. 3A, in one embodiment, the injection system 300 includes a material storage container 320 coupled to a metering device 308. The metering device 308 is coupled to the control module 120 so that an amount of material delivered to the system 302 may be monitored and/or metered. In one embodiment, the material storage container 320 is a container adapted to store material therein at substantially atmospheric pressures and has an operational pressure of between about zero to about 30 pounds per square inch. The material storage container 320 has a fill port 342 and a discharge port 344. The discharge port 344 is connected to the inlet 370 of the deliver vessel 310 and is typically positioned at or near a bottom of the material storage container 320.

The metering device 308 is coupled to the discharge port 344 to control the amount of material transferred from the material storage container 320 to the delivery vessel 310 through a material delivery line or inlet 370. The metering device 308 may be a shut-off valve, rotary valve, mass flow controller, pressure vessel, flow sensor, positive displacement pump, or other device suitable for regulating the amount of material dispensed from the material storage container 320 into the delivery vessel 310 for injection into the system 302. The metering device 308 may determine the amount of material supplied by weight, volume, time of dispense, or by other means. Depending on the material requirements of the FCC unit, the metering device 308 may be configured or programmed to provide the desired amount of material or combination of materials, such as from about 5 to about 4000 pounds per day of additive-type catalysts (process control catalyst) or from about 1 to about 20 tons per day of main catalyst. The metering device 308 typically delivers catalysts over the course of a planned production cycle, typically 24 hours, in multiple shots of predetermined amounts spaced over the production cycle. However, catalysts may also be added in an "as needed" basis or in a shot pot, as depicted in FIG. 3A. In an embodiment, the metering device 308 is a control valve 332 that regulates the amount of catalyst delivered from the catalyst storage container 320 to the system 302 by a timed actuation. Control valves suitable for use as a metering device are available from InterCat Equipment Inc., located in Sea Girt, N.J.

In a particular embodiment, the delivery vessel 310 is rigidly coupled to the mounting surface 304, as load cells are not needed to determine the weight of the delivery vessel 310 in this embodiment. The term "rigidly" include mounting devices, such as vibration dampers and the like, but excludes mounting devices that "float" the pressure vessel to facilitate weight measurement thereof. When the delivery is vessel is designed to deliver the entire vessel content and a zero calibration check may be performed, the delivery vessel may be mounted or unmounted. The delivery vessel 310 has an operational pressure of about 0 to about 100 pounds per square inch, and is coupled to a fluid source (e.g., a blower or compressor 108) by a first conduit 318. The first conduit 318 includes a shut-off valve 316 that selectively isolates the fluid source from the delivery vessel 310. A second conduit 328 couples the delivery vessel 310 to the system 302 and includes a second shut-off valve 332 that selectively isolates the delivery vessel 310 substantially from the system 302. The shut-off valves 316 and 332 are generally closed to allow the delivery vessel 310 to be filled with material from the material storage container 320 at substantially atmospheric pressure.

Once the material is dispensed into the delivery vessel 310, the control valve 332 is closed and the interior of the delivery vessel 310 is pressurized by a pressure control system 330 to a level that facilitates injection of the material from the delivery vessel 310 into the system 302, typically at least about 20 pounds per square inch. After the loaded delivery vessel 310 is pressurized by the pressure control system 330, the shut-off valves 316 and 332 are opened, allowing air or other fluid provided by the fluid source (e.g., blower 108) to enter the delivery vessel 310 through the first conduit 318 and carry the material out of the delivery vessel 310 through the second conduit 328 to the system 302 through the process line 122. In one embodiment, the fluid source provides air at about 60 to about 100 psi (about 4.2 to about 7.0 kg/cm2).

In operation, the material delivery system 300 periodically dispenses and injects a known quantity of material into the system 302. Material is filled into the low pressure material storage container 320 through the fill port 342 located in an upper portion of the material storage container 320. The weight of the storage vessel, including any material residing therein, is obtained by interpreting data obtained from the load cells 350.

In one embodiment, a predefined quantity of catalyst in the catalyst storage container 320 is transferred into the delivery vessel 310 by selectively opening the control valve 332 for a defined amount of time. After the catalyst has been transferred, the weight of the catalyst storage container 320 is obtained once again, and the exact quantity of catalyst added determined by subtracting the current weight from the previous measurement. Once the catalyst is transferred to the delivery vessel 310, the pressure inside the delivery vessel 310 is elevated by the pressure control system 330 to, typically, at least about 20 psi. After operating pressure is reached, valves 316 and 332 are opened. This allows fluid supplied by the fluid source, typically air at approximately 60 psi, to flow through the delivery vessel 310 and carry the catalyst to the system 302.

This metering system is advantageous over the prior art in numerous respects. For example, bulk storage of the catalyst at high pressure is not required, thereby allowing the catalyst storage container 320 to be fabricated less expensively as compared to pressurized bulk storage containers of some conventional systems.

Sensors

Sensors may provide one or more of the following information: In an embodiment depicted in FIG. 3C, sensors 358 are mounted proximate the inlet ports 370 such that a determination of whether or not a specific hose 388 is connected to the inlet port 370 of the pressure vessel 392. If the hose 388 is not connected to the port 370, the specific valves(s) associated with that particular port 370 can be automatically locked so that catalyst is not released from that port. This locking may be performed on manually or automated using the control module 120. The locking of a specific port permits safer operation of the FCC unit. Furthermore, by taking only a specific port off-line, the remainder of the FCC system can continue to operate without interruption or down time, in an automatic mode of operation. Once the sensor 358 indicates re-connection to the container/bin, the availability of material from the container 396 associated with that hose 388 is recognized by the computer control module 120. In one embodiment, the valves are capable of withstanding repeated cycling with streams containing abrasive materials, such as but not limited to, ceramic powders, clay, aluminum oxide, silicon oxide, zeolite, phosphorus oxide, or other high temperature reaction products.

If additional safety is required, a light, horn or other notification device can be activated to notify the operator to switch from inactive to active for the specific port 370 using the computer control module 120.

In another embodiment, a sensor 362 may be affixed to the end of the hose 388 coupled to the container 396. The sensor 362 is configured to provide the control module 120 with a metric indicate of at least one of the container or material disposed in the container. In one embodiment, the sensor 362 detects information provided on an RF readable tag 364 coupled to the container 396. The tag 364 may contain information relating to the unique identification of the container 396, such that the control module 120 may obtain information relating to the material inside that container 396. In another embodiment, the tag 364 may include information relating to the material inside container 396. Thus, utilizing the sensor 362, the control module 120 can confirm that a container 396 containing the correct material was coupled to the hose 388, thereby insuring that the correct material is injected into the system 302 while minimizing the potential for operator error.

Referring now to FIG. 3A, the injection system 300 may also include one or more sensors for providing a metric suitable for determining the amount of material passing through the metering device 308 during each transfer of material to the delivery vessel 310. The sensors may be configured to detect the level (i.e., volume) of material in the material storage container 320, the weight of material in the material storage container 320, the rate of material movement through the material storage container 320, discharge port 344, metering device 308, and/or material delivery line 334 coupling the container 320 and vessel 310, or the like.

In an embodiment, the sensor is a plurality of load cells 350 adapted to provide a metric indicative of the weight of material in the material storage container 320. The load cells 350 are respectively coupled to a plurality of legs 338 that support the material storage container 320 above a mounting surface 304. Each of the legs 338 has one of the plurality of load cells 350 coupled thereto. From sequential data samples obtained from the load cells 350, the control module 120 may resolve the net amount of transferred material after each actuation of the metering device 308 (e.g., the control valve 342). Additionally, the cumulative amount of material dispensed over the course of the production cycle may be monitored so that variations in the amount of material dispensed in each individual cycle may be compensated for by adjusting the delivery attributes of the metering device 308, for example, by changing the open time of the control valve 342 to allow more (or less) material to pass there through and into the delivery vessel 310 for ultimate injection into the system 302.

In another embodiment, the sensor may be a level sensor (not shown) coupled to the material storage container 320 and adapted to detect a metric indicative of the level of material within the material storage container 320. The level sensor may be an optical transducer, a capacitance device, a sonic transducer or other device suitable for providing information from which the level or volume of material disposed in the material storage container 320 may be resolved. By utilizing sensed differences in the levels of material disposed within the material storage container 320 between dispenses, the amount of material delivered may be resolved for a known storage vessel geometry.

In yet another embodiment, the sensor may be a flow sensor (not shown) adapted to detect the flow of material through one of the components of the material delivery system described herein. In one embodiment, the flow sensor may be a contact or non-contact device and may be mounted to the material storage container 320 or the material delivery line 334 coupling the material storage container 320 to the delivery vessel 310. For example, the flow sensor may be a sonic flow meter or capacitance device adapted to detect the rate of entrained particles (i.e., catalyst) moving through the material delivery line 334.

Plurality of Separate Material Storage Containers Coupled to the Vessel

Although FIG. 3A injection system 300 described above is shown configured to provide material from a single low pressure material storage container 320, the invention contemplates utilizing one or more injection systems coupled to the system 302 to introduce multiple materials from a plurality of separate material storage containers. Each of these injection systems may be controlled by either common or independent control modules 120.

Figure 4:
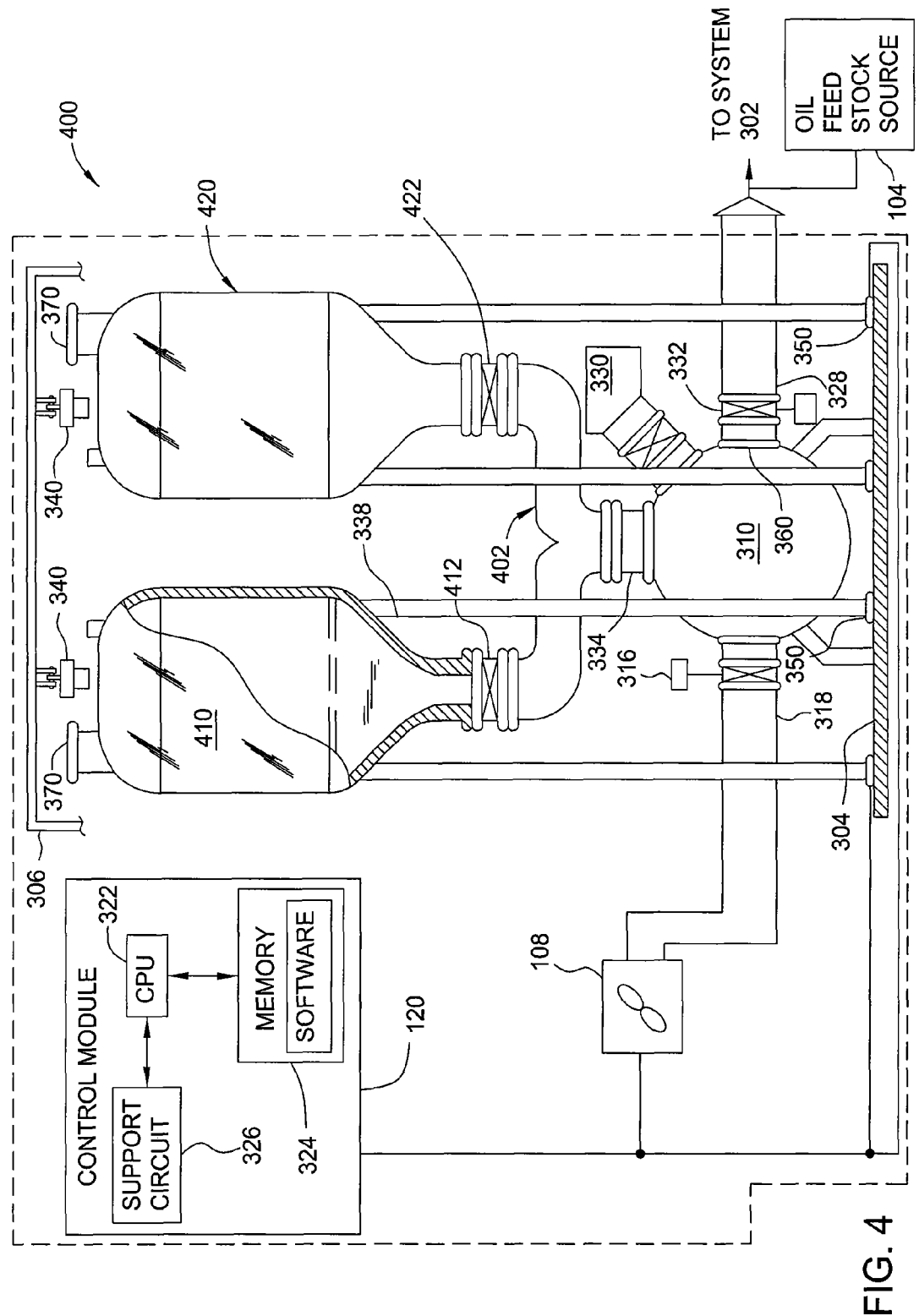
FIG. 4 is a schematic view of a fluid catalytic cracking system coupled to a material delivery system with a plurality of separate material storage containers in accordance with an embodiment of the invention.

FIG. 4 depicts another embodiment of a material delivery system 400 adapted to provide multiple materials to a system 302, such as an FCC unit. The injection system includes a delivery vessel 310 coupled to a plurality of separate material storage containers (i.e. storage vessels or low pressure vessels), illustratively shown in one embodiment as a first low pressure material storage container 410 and a second low pressure storage vessel 420. Any number of low pressure material storage containers may be coupled to a single delivery vessel 310, based on need and desire of the number of materials or time limit of material delivery, etc.

The separate material storage containers 410, 420 may be configured to deliver the same or different materials to the system 302 and operate substantially similar to material storage container 320, described above in FIG. 3A. In one embodiment, the storage vessels i.e. low pressure material storage container 410, 420 are coupled to a manifold 402 which directs the plurality of materials to a common material delivery line 334 for delivery into the delivery vessel 310. Alternately, each material storage container 410, 420 can be independently coupled to the delivery vessel 310 via a respective inlets formed in the vessel 310. Each material storage container 410, 420 is coupled to an independent metering device 412, 422 which controls the amount of material delivered from each material storage container 410, 420 to the delivery vessel 310 for injection into the system 302. In one embodiment, the metering device 412, 422 is configured similar to the metering device 308 described above. Furthermore, in one embodiment, one least one load cell is configured to provide a metric indicative of an amount of material dispensed from each separate material storage container 410, 420.

In this configuration, the material delivery system is capable of sequentially providing material from a predefined one of the material storage container storage vessels 410, 420, or alternatively, blending measured amounts from each material storage container storage vessels 410, 420 in the delivery vessel 310 for injecting into the system 302 in a single shot pot delivery or series of injections. The material delivery system 400 may further include one or more sensors to determine if the delivery vessel is respectively coupled to the inlet of a material storage container from the plurality of separate material storage containers.

Each container 410, 420 (and/or load cells 350) is interfaced with a calibration device 340 as described above. It is also contemplated that a single calibration device 340 may be adapted for interfacing with both containers 410, 420, for example, by repositioning the calibration device 340 along the frame 306, either manually, or by use of an actuator.

At Least Two Compartments Within Vessels

Figure 5:
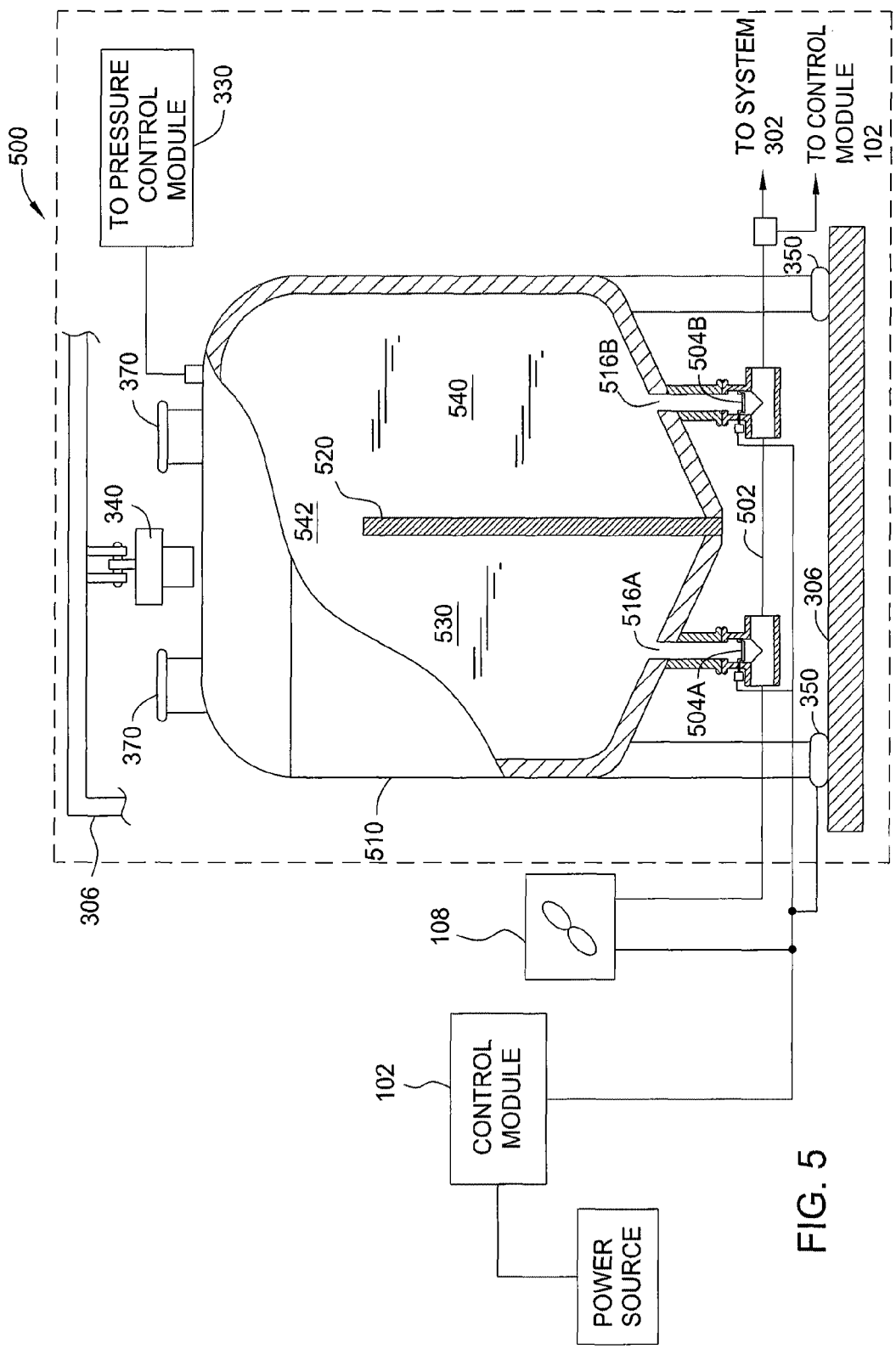
FIG. 5 is a schematic view of a fluid catalytic cracking system coupled to a material delivery system having at least two compartments in the delivery vessel in accordance with an embodiment of the invention.

FIG. 5 depicts another embodiment of a material delivery system 500 coupled to a system 302, such as an FCC unit. The material delivery system 500 is adapted to provide multiple materials to the system 302, either in a mixed state or individually. The material delivery system includes a delivery vessel 510 interfaced with one or more load cells 350 suitable for providing a metric suitable for resolving a change in weight of the vessel 510. The vessel 510 (and/or load cells 350) is interfaced with a calibration device 340 as described above.

The vessel 510 also includes a separator 520 disposed in the vessel and defining at least two compartments 530, 540 within the vessel. A plenum 542 may be defined in the vessel common to each compartments, or each compartment may have its own separate plenum above the material disposed therein. Each compartment 530, 540 has a respective outlet 516A, 516B. It is contemplated that the vessel may be divided into any number of compartments and each compartment may independently be of varying shape.

The compartments 530, 540 may be configured to deliver the same or different materials to the system 302 and operate substantially similar to material delivery system 380 described above. In one embodiment, the compartments of the delivery vessel are coupled to a manifold which directs the plurality of materials to a common material delivery line 502 for delivery to the system 302. Alternately, each compartment 530, 540 of the delivery vessel can be independently coupled via a respective inlet for delivery to the system 302. Each compartment may be coupled to an independent metering device 504A, 504B which controls the amount of material delivered from each compartment of the delivery vessel 510 for injection into the system 302. In one embodiment, the metering devices 504A, 504B are configured similar to the metering devices described above.

In an embodiment, the material delivery system 500 is capable of sequentially providing material from a defined compartment of the delivery vessels, or alternatively, blending measured amounts from one or more compartments in the pressure vessel for injecting into the system 302 in a single shot pot or series of series of injection. The material delivery system may further include one or more sensors to determine if the FCC system respectively coupled to an inlet of a compartment from plurality of compartments of the vessel.

In a particular embodiment, the material delivery system includes a control module 120 for controlling the rates and/or amounts of material provided to the system 302 by the material delivery system 500.

Mobile Material Delivery System

Figure 6:
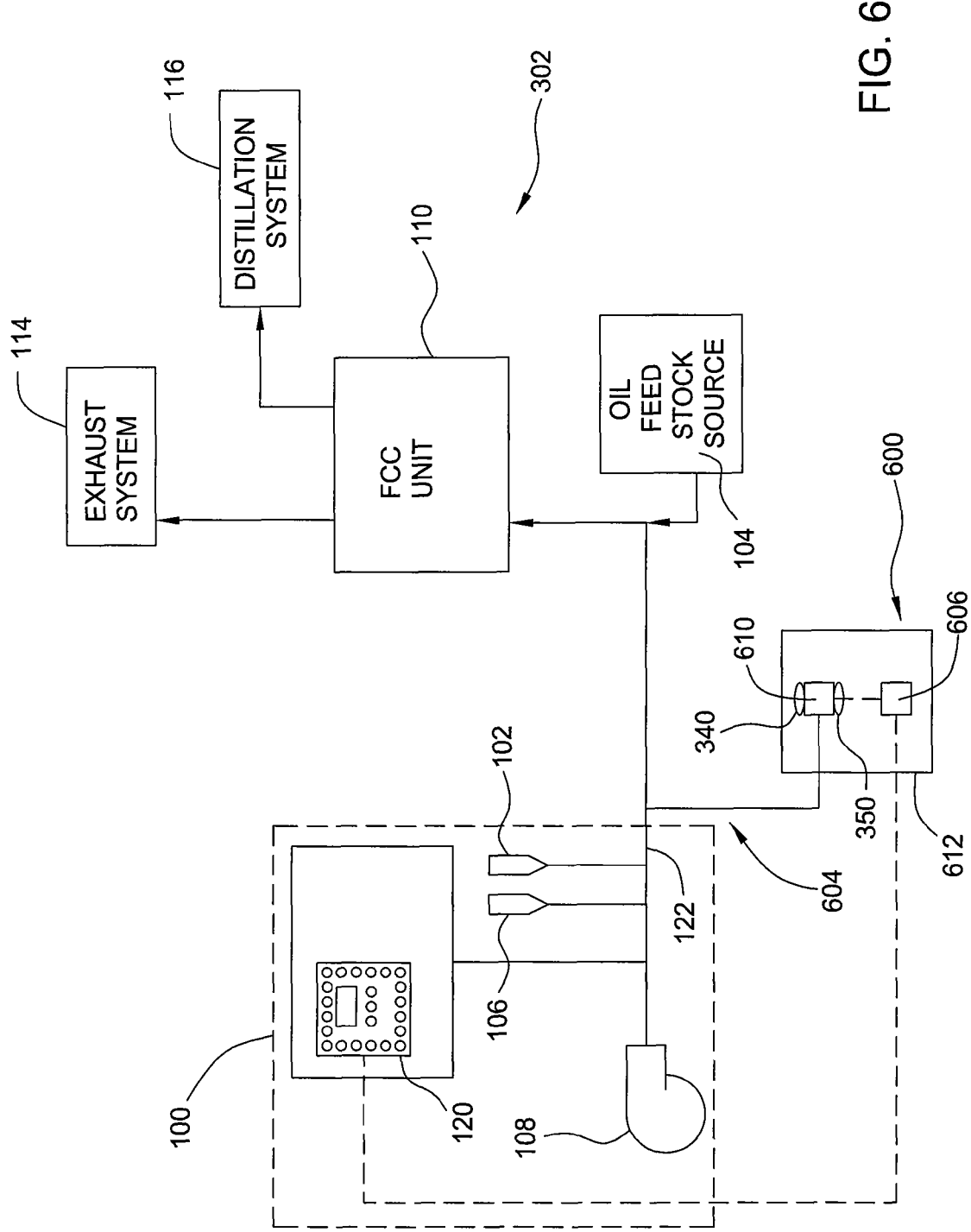
FIG. 6 is a schematic view of a fluid catalytic cracking system coupled to a mobile material delivery system in accordance with an embodiment of the invention.

FIG. 6 is a simplified schematic of an embodiment of mobile material delivery system 600. The mobile material delivery system 600 is configured to be easily transportable over great distances thereby enabling the mobile material delivery system 600 to be shipped and coupled to an existing system 302, such as a fluid catalytic cracking system 130 on short notice. Additionally, the modular aspects of the mobile material delivery system 600 also enables the material delivery system 600 to be decoupled from one fluid catalytic cracking system, transported, and coupled to another fluid catalytic cracking system with minimal effort. Thus, the mobile material delivery system 600 enables a refiner to configure a working refinery with material delivery systems with minimal lead time, thereby providing the process control flexibility required to quickly take advantage of market opportunities and address unplanned events requiring process change, such as limiting emissions through catalyst reactions.

The mobile material delivery system 600 includes a material injection vessel 610 mounted to a transportable platform 612. The vessel 610 is interface with one or more load cells 350 that are configured to provide a metric suitable for determining an amount of material dispensed from the vessel 610 from a change in weight of the vessel 610. The vessel 610 (and/or load cells 350) is interfaced with a calibration device 340 as described above.

The material injection vessel 610 may be one or more vessel or vessel and container combinations as described herein. The vessel 610 is coupled by a conduit 604 to the process line 122 to deliver material to the system 302. The conduit 604 may be a flexible process pipe, a temporary process pipe, or a hard pipe.

The mobile material delivery system 600 may optionally include a controller 606 to control the dispense of material delivered from the delivery vessel to the FCC unit 110. The controller 606 may be coupled to a control module 120 of the fluid catalytic cracking system 130 to coordinate material injections and exchange data. Alternatively, the controller 606 may control the injection of material from the mobile material delivery system 600 in a stand-along configuration. It is also contemplated that the mobile material delivery system 600 may be controlled by the control module 120 of the fluid catalytic cracking system 130 without use of a dedicated controller 606 on-board the material delivery system 600.

The transportable platform 612 is generally configured to support the material injection vessel 610 and associated components. The transportable platform 612 may be mounted to a foundation at the fluid catalytic cracking system 130, or be disposed adjacent thereto. The transportable platform 612 is configured to facilitate shipment of the mobile material delivery system 600 by conventional means, e.g., road, air, sea or rail. For example, in an embodiment, the mobile material delivery system 600 has a transportable platform 612 in the form of a container, which allows for rapid delivery of the mobile material delivery system 600 by conventional means, for example, by truck, ship, plane, train, helicopter, barge and the like. It is also contemplated the transfer platform 612 may be integrally part of a trailer, barge, ship, plane, truck, rail car and the like. The ease of transporting the platform 612 advantageously allows the mobile material delivery system 600 to be coupled and begin injecting material to the FCC unit 110 within a matter of hours or even as little as less than one hour, compared with the several days required to install a conventional permanent or semi-permanent injection system, which is substantially less than the time required to ship, assembly and install a conventional injection system.

An embodiment of the mobile material delivery system 600 includes a vessel 610 that may be feed by a plurality of material storage containers, as described with reference to FIGS. 3C and 4. In another embodiment, the vessel 601 may have a plurality of internal compartments, as described with reference to FIG. 5 which may provide mixtures of different material as needed or per a predefined process sequence. Another embodiment of the mobile material delivery system 600 also provides mixtures of different material as needed or per a predefined process sequence.

Methods

Figure 7:
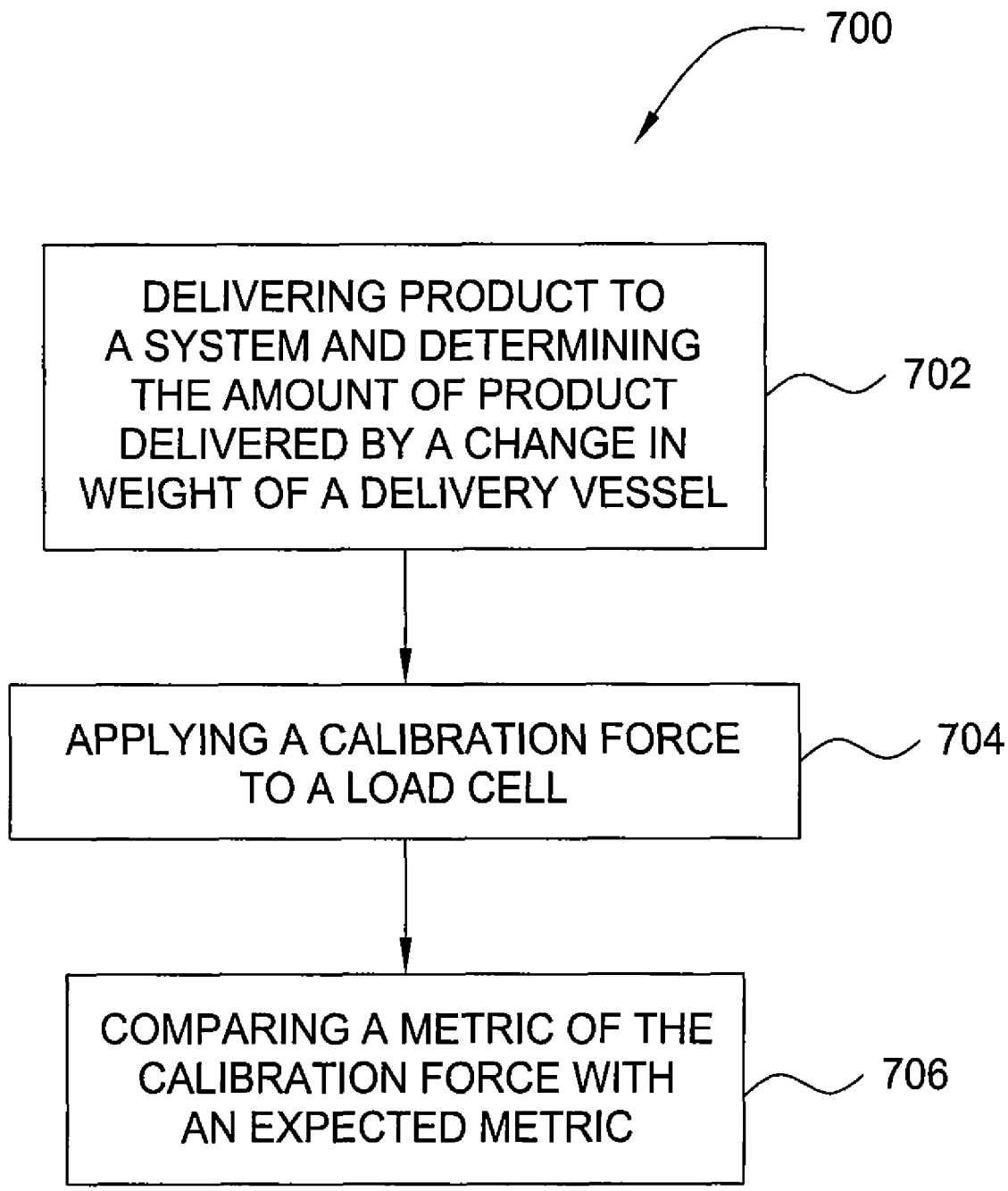
FIG. 7 is a flow diagram of a method of providing a material to a system in accordance with an embodiment of the invention.

FIG. 7 is a flow diagram on one embodiment of a method 700 for delivering a material i.e. catalyst, additive, equilibrium spent catalyst, catalyst fines, etc, to a system, such as an FCC unit. The method 700 may be practiced with the material delivery system described above, or other suitable delivery system.

The method 700 begins at step 702 by delivering a material to the system and determining how much material is delivered by a change in weight of a vessel of the delivery apparatus. The determination may be made by weight gained or weight lost by the vessel over the course of the material delivery. Step 702 may be repeated as many times as desired.

At step 704, a known calibration force is applied to the load cells. In one embodiment, the known calibration force may be applied to the load cells through the vessel, to the load cell directly, or to a structure coupled between the vessel and load cell. The force may be applied to the load cells while the vessel is full, empty or partially filled. The force may be applied during on going processing by the system to which the vessel is connected without interruption. For example, refinery processes may continue without interruption while the load cells of a material delivery system coupled to the FCC unit are calibrated, with the material delivery system remaining fully operational and ready to inject material to the FCC unit during the application of the calibration force.

At step 706, the metric providing by of the load cells with the known calibration force applied is compared with an expected metric. Alternatively, the force reading provided by the load cells while the known calibration force is applied is compared with the know force. If the difference is outside of a predetermine range, a service flag is issued. If the difference is within operational tolerances, then the software adjusts at least one of the output of the load cell or the software algorithm so that the output reading of the load cells is indicative of the true force upon the load cell, and consequently, a more accurate determination of the transfer material may be made. The method may also include recording the metric of the known force imparted on the vessel and determining any deviation between the recorded measured metric and known value of the force imparted by the calibration device.

Figure 8:
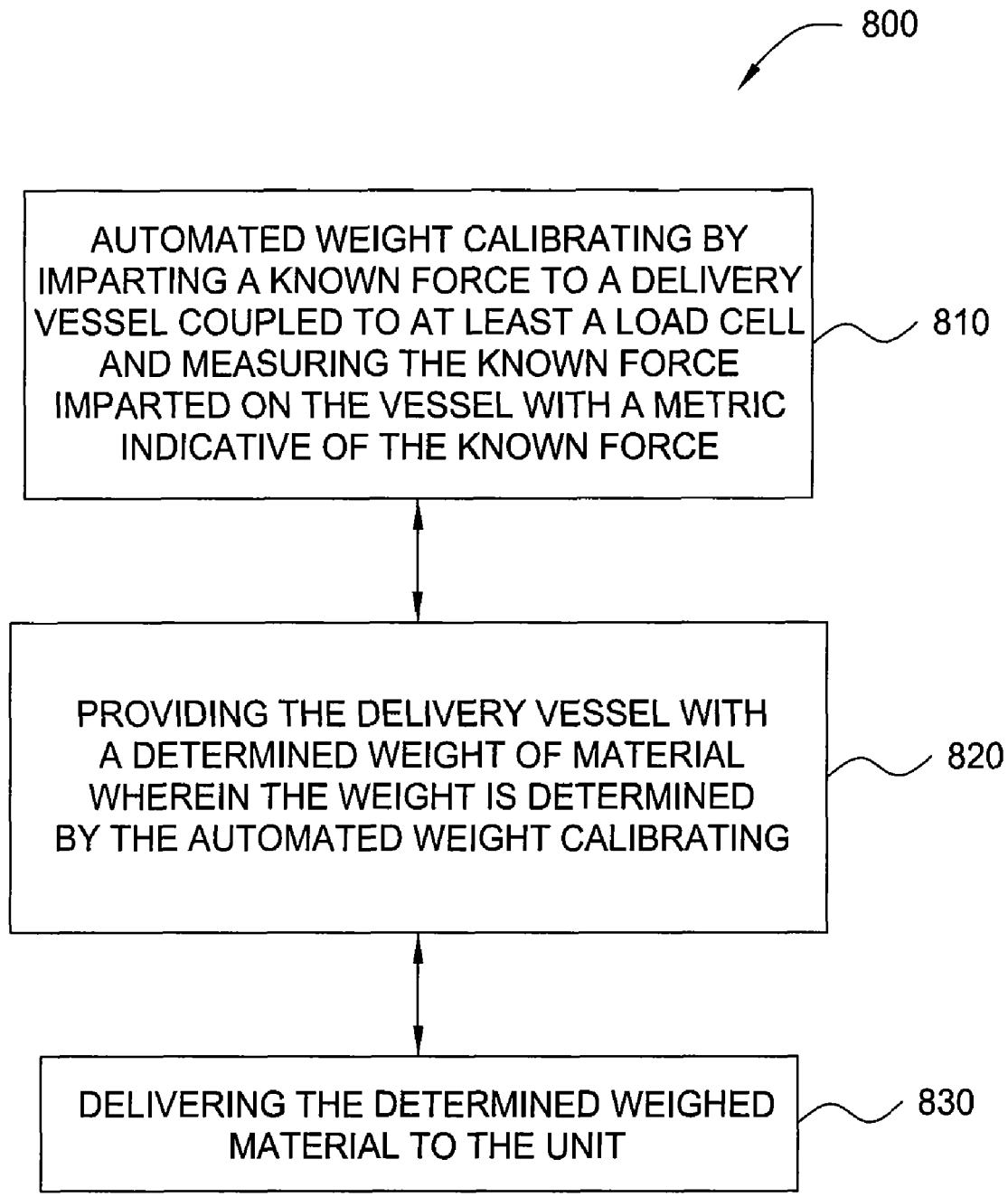
FIG. 8 is another flow diagram of another method of providing material to a system in accordance with an embodiment of the invention.

With reference to FIG. 8, next is described a method of providing material. FIG. 8 is a flow chart of one embodiment of a method for metering material to a system such as FCC. The method is not limited by the order or frequency of the steps.

The method 800 includes step 810 automated weight calibrating by imparting a known force to a delivery vessel coupled to at least a load cell and measuring the known force imparted on the vessel with a metric indicative of the known force. It should be appreciated that the method is not limited by how the force imparted.

Step 820 includes providing the delivery vessel with a determined weight of material, wherein the weight is determined by the automated weight calibrating. Additionally, the method includes automated weight calibrating a plurality of times, with frequency time intervals as desired.

Step 830 includes delivering the determined weighed material to a system such as FCC unit. Some features of the method in respective embodiments include delivery of weighed amount of material or product based on a 'gain-in-weight' and or 'loss-in-weight' method.

The information concerning any deviation between the measured metric and the value of the known force imparted by the calibration device may be sent to a remote control center outside of an FCC unit. Corrective action with respect to any deviation between the measured metric and known value of the force imparted by the calibration device may also be performed. Corrective actions include, but are not limited to, adjusting any deviation between the measured weight and known value of force imparted by the calibration device in proportion to the ratio of the deviation between the measured weight and known value of force imparted, adjusting the load cell downward to equal the known value of the force imparted on the vessel, adjusting the load cell upward to equal the known value of the force imparted on the vessel, adjusting at least a subsequent delivery of a material into the FCC unit based on the deviation. Corrective action may also include introducing, during a subsequent basic cycle time, an amount of the material which is less than the nominal addition amount when the measured weight is less than the known value of force imparted or introducing, during a subsequent basic cycle time, an amount of the material which is more than the nominal addition amount when the measured weight is greater than the known value of force imparted.

The methods above may contain one or more of the following optional steps. A first optional step is an integration with an off-site computer database system: The computer controller of the embodiments of the invention can be linked via land-line telco, wireless modem, internet connection, etc. to a central server which can maintain the various parameters of the embodiments of the disclosed addition system. The notifications of injection of materials, deviations in measurement of known weight, etc. can either be made by the addition system itself, or via an externally connected computer system. Furthermore, the offsite external system can permit parameters within the addition system controller to be changed based without a person physically being required to be on-site at the controller unit.

Another option is tracking of injected material i.e. product can also be accomplished with the embodiments of the disclosed addition system by sending data about a specific catalyst, date, time, amount of addition, back to the central database which further integrates with the previous usage of the catalyst as well as shipments to the specific location. From this inventory reconciliation, features such payment upon-delivery can be accomplished as well as notification to reorder upon reaching a minimum quantity threshold for a specific location/unit. Data can be removed from the disclosed embodiments of the invention systems via a variety of means.

Data can be physically extracted via on-board USB or other type of memory storage device. Alternatively, data can be sent via electronic means over the internet or via a secure data network within the refinery or externally via land-line telco line, wireless cellular network, etc. When data is sent via wireless cellular over the internet or other insecure means, then a virtual private network (VPN) may be employed. VPN technology, either hardware or software based, helps secure data transfers or communication between the addition system controller and the home network.

Figure 9:
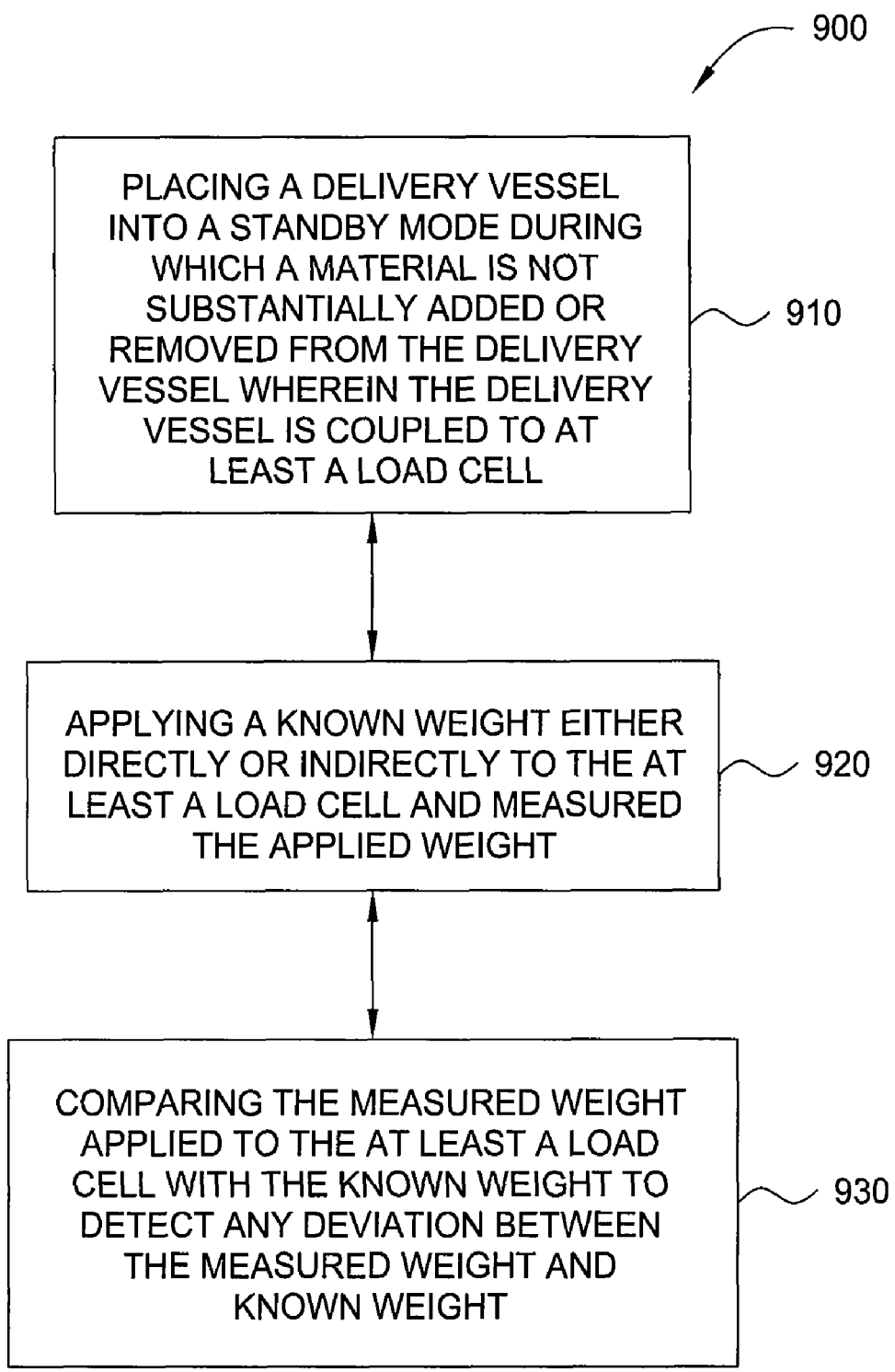
FIG. 9 is a flow diagram of a method of automatically checking the calibration of a delivery vessel in accordance with an embodiment of the invention.

With reference to FIG. 9, next will be described a method 900 of automatically checking the calibration of a delivery vessel. FIG. 9 is a flow chart of the method 900. The method 900 includes step 910 placing a delivery vessel into a standby mode during which a product is not substantially added or removed from the delivery vessel, wherein the delivery vessel is coupled to at least a load cell. Step 920 includes applying a known weight, either directly or indirectly, to the at least a load cell and measuring the applied weight. Step 930 includes comparing the measured weight with the known weight to detect any deviation between the measured weight and known weight.

The methods described allow for multiple catalysts to be injected into the FCC unit as needed, simultaneously or sequentially. For example, one catalyst may control emissions from the cracking process and another catalyst may control the resultant cracked product mix produced by the FCC unit. Controlling the addition of multiple catalysts allows greater process flexibility with reduced capital expenditures.

Furthermore, the methods are not limited by how the force is imparted onto the load cell nor are the methods limited by the frequency or sequence of automated weight calibrating. Nor are the methods limited by the sequential order of steps or frequency of steps. In one embodiment, the method includes automated weight calibrating each delivery of a catalyst to an industrial process to check for accuracy of the amount of catalyst delivered. However, the automated calibrating may be conducted a plurality of times at desired frequency intervals e as many times as one wishes based on the degree of accuracy and precision need for an industrial system and acceptable deviation ranges that are allowed for a given weight of catalyst to be delivered. The automated weight calibrating can periodically apply an equivalent weight to the delivery vessel and determine any deviation while continuing to deliver catalyst. In another embodiment, the automated weight calibrating may impart an equivalent weight to the delivery vessel and monitor any deviation regular on periodic basis, such as per dose, per hour, per day, per week, etc.

THE FOLLOWING EXAMPLES ARE FOR ILLUSTRATION AND NOT LIMITATION

Example 1

General Operation

Small, approximately 10 cu ft. delivery vessel is fitted with load cells and placed within a portable platform, such as a tubular frame structure. The portable platform does not require a foundation, unlike many other systems of similar daily throughput capacity. An example of such as configuration is provided with reference to FIG. 6. The delivery vessel include multiple inlet ports for filling the vessel from separate containers, and a single discharge port. Within this embodiment delivery vessel, there are no partitions or valves. An example of such a configuration is provided with reference to FIG. 3C. However, other embodiments of a delivery vessel with partitions or parts are included within the scope of the invention, such as provided with reference to FIG. 5. The delivery vessel includes 4 inlet ports, but the actual number of inlet ports may readily be increased or decreased, depending on preference. The inlet ports are coupled up to one or more of the following catalyst storage container product:

1. Fresh catalyst
2. Additives
3. ECAT
4. FCC fines

As previously described, product includes catalyst, additive, equilibrium spent catalyst, catalyst fines, etc. and may be used interchangeably in the context of a material delivery system providing a material regardless of the form of the material or what the material is referred as.

The total daily throughput of the unit depends on the number of inlet ports being used, and the quantity of being added from each inlet. In general, the delivery vessel unit appears to be capable of adding in excess of 40-50 MT/day of total catalyst. The amount of addition for each specific catalyst may range from a minimum value as low as a single addition all the way up to the maximum of the unit, if no other catalysts are used. There is virtually an infinite number of combinations of catalysts and quantities which can be added to the system.

Each inlet port, at its respective end-point, is connected to a catalyst storage container. Non-limiting examples of types of catalyst storage containers include but are not limited to:

1. Bulk bin.
2. Drum with port connector.
3. Portable Bulk Storage such as Bulk pneumatic container (portable drytainer, wheeled PD truck, etc.)
4. Permanent Bulk Storage such as Silo or other vessel that is located on-site.

The type of delivery vessel, along with the daily addition requirements of each catalyst, determines the frequency of change-out of containers or re-filling of the delivery vessels.

Example 2

Installation of the Unit and Basic Components

The delivery vessel is connected to the input port connections via hard-pipe or flexible hosing using the provided fittings. Current configuration provides 2 fittings on each side of the unit delivery vessel.

The sensor disposed near the interface between the hose and the container provide to the controller at least one of the name or type of catalyst, quantity of catalyst within the container or container identification code, among others. Ultimately, the catalyst within each container is identified for each respective input port. The control module keeps track of which catalysts are coupled to each of the inlet ports as well as keeping a running total of the quantity of each catalyst added into the FCC via the delivery vessel.

The outlet port of the delivery vessel is connected via hard or flexible piping to the input port of the FCC unit, where catalyst is normally injected.

An air supply is hooked up to the material delivery system. The air supply can either be from fixed supply of the refinery, or from a portable unit. In one embodiment, the air supply is of constant pressure and volume and contains minimum to no water content.

Electrical connections are made to the main control unit, which powers the control module of the material delivery system, as well as the various valves and other electrical items within the material delivery system.

In one embodiment, the material delivery system contains its own frame to support the delivery vessel and calibration device; hence, foundation is not required for this embodiment of the material delivery system.

Example 3

Operation of the System

The control module evaluates the catalysts that require addition based on one or more combinations of the following non-limiting non-exclusive factors:

a. Number of catalysts being added.
b. Type of catalyst being added (catalyst or additive)
c. Required addition rate of each catalyst.
d. Any off-line time during the recent past. This is required to possibly make-up any downtime in future addition sequences.
e. Period of addition (present time to end of day, present time to x (i.e. 24) hours later).
f. Desired quantity of each addition to the FCC.
g. Precision and accuracy requirement.

The control module evaluates the parameters above and determines the optimal sequence and quantity of addition to use for the additions.

The control module is placed on automatic control and the sequence of additions of the various input ports is commenced. For each addition from specific port, the following is the operation:

a. The system confirms all outlet and inlet ports/valves are closed. The computer then opens the desired inlet port valve and applies vacuum via the built-in eductor fitted with carrier air to fill the delivery vessel to the desired weight of catalyst. The control module monitors various factors related to the addition such as valve position, rate of weight change, actual weight in vessel, etc. and modifies the valve position or other parameter which is capable of changing the rate of addition of catalyst such that the final weight in the vessel is close to the target weight. The actual weight in the vessel is then recorded and from which the quantity of catalyst to be added during this sequence into the FCC may be resolved.

b. The inlet ports/valves are closed and vacuum application to the vessel is stopped.

c. The vessel is pressurized using air or other pressurizing medium to the desired pressure.

d. The outlet port valve is opened and the catalyst is transferred directly into the FCC unit via the transfer line.

e. The weight of the vessel is monitored to determine when the vessel is empty.

f. The application of the air/pressurizing medium is discontinued and the outlet valve is closed.

g. Any desired hold time is effected at this point as determined by the computer controller based on the evaluation parameters above.

h. The sequence above is repeated for the next catalyst/port combination, or if only one catalyst is being used, the same catalyst/port is utilized.

i. If the catalyst input is being tracked by the system, or other external monitoring device such as silo measuring device, then the material delivery system's control module may use this input to notify the operator that the vessel/container/silo is either nearing empty or is empty. Notification can be provided via email, wireless cellular, hard-wire telco line, light on unit or in control room, siren, or many other notification means available in the art. If replacement of a container coupled to the vessel is required, the operation of the material delivery system or opening of a specific port may be temporarily suspended while the container is changed. The current design includes the ability for the operator to suspend either the entire system, or a specific port for bin/container change-out. In the case in which a specific port is suspended, the control module which keeps track of the quantity of catalyst taken from that specific container/bin can be re-set to zero.

The embodiments of the disclosed addition system described includes the ability to add one or more catalysts into an FCC unit based on desired or target weight of each component on some frequency basis (per hour, day, week). The control module can also be programmed such as to perform one or more the features, illustrated in examples 4 and 5.

Example 4

Relationship Between One Catalyst and Another

In this example, catalyst A is fresh FCC base catalyst added at a rate of 10 MT/day and Catalyst B, an additive such as sulfur oxide abatement additive i.e. Intercat Super SOXGETTER, is added at a rate of 1 MT/day. The above process description is set-up to perform this type of operation sequence. The control module is set to know that 10 MT/day of Catalyst A and 1 MT of catalyst B is needed. If the amount of catalyst A or B is changed, the control module may be programmed to maintain the relative proportion of catalyst A to B. In this example, assume that catalyst A is changed to 15 MT/day from the current 10 MT/day. If the 10% ratio of Catalyst B to Catalyst A is to be maintained, then the material delivery system needs to increase the addition of Catalyst B to 1.5 MT/day. The change may be done manually, or the control module can make the calculation and make the change automatically.

Example 5

Automatically Adjusting One or More Port Input Catalyst or Additive Additions to Meet a Specific Unit Operating Parameter In one embodiment, a refiner would like to maintain a specific level of sulfur dioxide ($SO_2$), to be emitted from the FCC unit. The control module can make appropriate changes in the addition rate of catalyst B, the sulfur oxide abatement additive, based upon input from a sulfur dioxide meter to maintain SO2 at a desired level, such as needed to comply with environmental protection agency regulations etc. The control module can make the appropriate changes on a routine, continual basis, or just during emergency peak periods, such as when the $SO_2$ level reaches a certain percentage of the maximum allowable emissions. In this way, the refinery can maintain compliance with $SO_2$ emissions while utilizing less sulfur oxide material, catalyst B. Another embodiment is maintaining performance of a FCC unit. Measured parameters such as but not limited to feed quality (feed API, metals content i.e. Nickel, Vanadium, Iron, Nitrogen, Sulfur) can have a major impact on an FCC unit performance, often measured by such parameters such as conversion or dry gas make. If one or more of these metals are expected, then the addition rate of fresh catalyst can often be changed to mitigate or minimize the effect that any of these metals or other parameters may have on performance of the FCC unit. For instance, high nitrogen content in feed is known to poison the base FCC catalyst. If lab data on a specific feed is known, then the control module of the material delivery system, either manually or automatically, increase catalyst addition rates during this period. In a particular embodiment, changes in rate of catalyst addition are automated as manpower on FCC unit is often limited. In an automated mode, lab data for feed nitrogen may be directly fed to the control module of the material delivery system and the catalyst addition rate may be increased as the feed nitrogen increased, or decreased as the feed nitrogen decreased. This leads to an overall more consistent FCC operation, leading to increased profitability on the FCC unit.

Although the teachings of the present invention have been shown and described in detail herein, those skilled in the art can readily devise other varied embodiments that still incorporate the teachings and do not depart from the scope and spirit of the invention.

While the invention has been described in detail in connection with only a limited number of aspects, it should be readily understood that the invention is not limited to such disclosed aspects. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A material delivery system comprising:
   a delivery vessel adapted for coupling to an unit;
   at least one load cell configured to provide a metric indicative of an amount of material in the delivery vessel; and
   an automated load cell calibration device configured to impart a known force externally onto the delivery vessel and transmitted to the at least one load cell.

2. The material delivery system of claim 1, wherein the delivery vessel has at least an outlet adapted for coupling to an unit selected from a group consisting of a fluid catalyst cracking unit; manufacture of pyridine and its derivatives, manufacture of polypropylene, manufacture of polyethylene, and manufacture of acrylonitrile.

3. The material delivery system of claim 1, wherein the automated load cell calibration device is adapted to impart a known force a plurality of times at desired frequency intervals.

4. The material delivery system of claim 1, wherein the automated load cell calibration device is adapted to directly or indirectly applying the known value onto the at least on load cells attach to the delivery vessel.

5. The material delivery system of claim 1, wherein the delivery vessel is a pressure vessel comprising a pressure control device coupled to the delivery vessel and configured to selectively pressurize the delivery vessel relative to at least one material storage container to a pressure sufficiently high enough to provide material to the unit.

6. The material delivery system of claim 1, further comprising a recording device to record the metric of the known force imparted on the vessel and determining any deviation between the recorded measured metric and known value of the force.

7. The material delivery system of claim 1, further comprising a feedback loop to take corrective action when the measured force deviates from the known value of desired force imparted by the calibration device.

8. The material delivery system of claim 1, wherein the automated load cell calibration device comprises physical calibration weight, pressure transmitter, electrical transducer, mechanical screw, and combinations thereof.

9. The material delivery system of claim 1, wherein the automated load cell calibration device comprises a pressure transmitter capable of imparting the known force directly without adding any material onto the vessel.

10. The material delivery system of claim 1, further comprising a plurality of separate material storage containers coupled to the vessel respectively via a plurality of inlets, a respective one of each inlet coupled to a separate material storage container.

11. The material delivery system of claim 10, wherein the at least one load cell is configured to provide a metric indicative of an amount of material dispensed from each separate material storage container.

12. The material delivery system of claim 10, further comprising a sensor to determine if the vessel is respectively coupled to the inlet of a material storage container from the plurality of separate material storage containers.

13. The material delivery system of claim 1, further comprising:
 a separator disposed in the vessel and defining at least two compartments within the delivery vessel;
 a plenum defined in the delivery vessel and fluidly coupled to each compartments; and
 a plurality of outlets, a respective one of each outlets coupled to a respective compartment.

14. The material delivery system of claim 13, further comprising a sensor to determine if a specific hose is respectively coupled to an inlet of a compartment from plurality of compartments of the delivery vessel.

15. The material delivery system of claim 13, wherein the at least one load cell comprises a plurality of load cells, respectively one of each load cells coupled to a respective compartment to provide a metric indicative of an amount of material dispensed from each compartment of the delivery vessel to the unit.

16. A method of providing material to an unit comprising:
 i) imparting a known force externally onto a delivery vessel and transmitting to at least a load cell coupled to the delivery vessel and measuring the known force imparted on the delivery vessel with a metric indicative of the known force, wherein the known force is imparted by providing the delivery vessel with a predetermined weight of material;
 ii) calibrating the at least one load cell by comparing the known weight of material with the measured force; and
 iii) delivering the material from the delivery vessel to the unit.

17. The method of claim 16, wherein the unit includes at least a unit selected from a group consisting of a fluid catalyst cracking unit; manufacture of pyridine and its derivatives, manufacture of polypropylene, manufacture of polyethylene, and manufacture of acrylonitrile.

18. The method of claim 16, further comprising sending information concerning any deviation between the measured metric and known value of the force imparted by the calibration device to a remote control center outside of the unit.

19. The method of claim 16, further comprising recording the metric of the known force imparted on the delivery vessel and determining any deviation between the recorded measured metric and known value of the force.

20. The method of claim 16, further comprising performing any needed corrective action with respect to any deviation between the measured metric and known value of the force imparted by the calibration device.

21. A method comprising:
 i) delivering material to an unit and determining how much material is delivered by a change in weight of a delivery vessel, wherein the delivery vessel comprises a load cell;
 ii) applying a known calibration force externally onto the delivery vessel and transmitting to the load cell; and
 iii) comparing a metric from the load cell of the known calibration force with an expected metric.

22. A method of automatically checking the calibration of a delivery vessel comprising:
 i) placing a delivery vessel into a standby mode during which a material is not substantially added or removed from the delivery vessel, wherein the delivery vessel is coupled to at least a load cell;
 ii) applying a known weight externally onto the delivery vessel, either directly or indirectly, and transmitting to the at least a load cell and measuring the applied weight while the delivery vessel is in the standby mode; and
 iii) comparing the measured weight applied to the at least a load cell with the known weight to detect any deviation between the measured weight and known weight.

23. The method of claim 22, further comprising calibrating the vessel by making corrections to the actual weight of the delivery vessel based on the deviation between the known and measured weight.

* * * * *